United States Patent [19]
Noritake et al.

[11] Patent Number: 6,069,466
[45] Date of Patent: May 30, 2000

[54] METHOD FOR DRIVING OPENING/ CLOSING MEMBER

[75] Inventors: Seiichiro Noritake; Kazunori Nishikawa, both of Nagano, Japan

[73] Assignee: Kabushiki Kaisha Sankyo Seiki Seiakusho, Nagano, Japan

[21] Appl. No.: 09/220,853

[22] Filed: Dec. 28, 1998

[30] Foreign Application Priority Data

Dec. 26, 1997 [JP] Japan ................................. 9-368104

[51] Int. Cl.[7] ................................................. G05B 19/40
[52] U.S. Cl. ........................ 318/685; 318/696; 318/282; 318/286; 318/468; 318/467; 318/445; 318/449
[58] Field of Search ..................................... 318/685, 696, 318/282, 286, 468, 466, 467, 445, 449

[56] References Cited

U.S. PATENT DOCUMENTS 5,897,227 4/1999 Haraguchi et al. .................... 318/685

FOREIGN PATENT DOCUMENTS 6-109354 4/1994 Japan ................................ F25D 17/08

*Primary Examiner*—Karen Masih
*Attorney, Agent, or Firm*—Sughrue, Mion, Zinn, Macpeak & Seas, PLLC

[57] ABSTRACT

In an opening/closing member driving method in which the rotation of a motor rotatable in two directions is transmitted through a transmission member to an opening/closing member to thereby drive a baffle 4 in an opening direction A and in a closing direction B, when driving the transmission member from an intermediate position to an original position which is set at a position where the transmission member is moved to the full in one direction or in the other direction, the transmission member is once driven in the opposite direction to the original position and is stopped at such opposite position or in the neighborhood of the opposite position and, after then, the transmission member is driven in the original position direction by an amount equivalent to the normal movement thereof and is thereby returned to the original position.

21 Claims, 18 Drawing Sheets

METHOD FOR DRIVING OPENING/ CLOSING MEMBER

BACKGROUND OF THE INVENTION

1. Field of the Invention

The present invention relates to a method for driving an opening/closing member to open and close an opening. In more particular, the present invention relates to an opening/closing member driving method which is suited to re-initialize (re-recognize) the initial position (original position) of an opening/closing member.

2. Related Art

Conventionally, as a device for opening and closing an opening part using an opening/closing member, there are proposed various kinds of devices such as a damper device for a refrigerator which is installed within a cool air blow-out portion of the refrigerator or a cool air duct thereof. For example, as shown in FIGS. 17 and 18, in a motor type damper device 101 which is a single type damper device for a refrigerator including a single opening part, there is employed a structure in which a baffle 103 and a drive mechanism part 104 are disposed in a mutually opposed manner with a rotation support shaft 102 between them (see Unexamined Japanese Patent Publication Hei. 6-109354). In operation, in the motor type damper device 101, the rotation torque of a motor is transmitted to the rotation support shaft 102 and thus the baffle 103 is rotated about the rotation support shaft 102, thereby opening and closing an opening part 106 which is formed in a frame 105.

By the way, when such single type or motor type damper device 101 including a single opening/closing member is installed in a refrigerator, the motor type damper device 101 is controlled in such a manner that the baffle 103 can be set in a full opened position and in a full closed position. However, if the baffle 103 is set in the full opened position, then a cool air cooled by a cooling device is smoothly flown into the refrigerator but too much, so that the temperature of the interior portion of the refrigerator is lowered too much. For example, in a refrigerator including a compartment which is referred to as a chilled compartment, the interior of the chilled compartment must be severely controlled to a predetermined temperature. In this case, the baffle 3 is controlled in such a manner that it can also be set at an intermediate position between the full opened and closed positions thereof. That is, the baffle 3 can be held respectively at the full closed position, full opened position and intermediate position. By the way, in some specifications, there is employed a structure such that the baffle 103 is not driven up to the full opened position thereof but is driven only up to the intermediate position thereof.

Also, in the damper devices for use in a refrigerator and the like including the above-mentioned motor type damper device 101, when the opening part 106 is closed by the baffle 103, an cool air or the like must be shut out forwardly. For this purpose, a lead switch or the like is used to detect the position of the baffle 103.

Also, recently, there has been increasing a refrigerator of a type that the interior portion of the refrigerator is divided into two or three or more compartments and all of the compartments are controlled in temperature. In particular, in the refrigerator of this type, there are used a plurality of motor type damper devices 101 each including a single opening part 106 shown in FIGS. 17 and 18, or there is used a double damper device 111 including two openings 106 as shown in FIG. 19. In the double damper device 111, there are formed two openings 106 and 106 in the frame 105 and a drive mechanism part 104 such as a motor and the like is disposed on the lower side of the back surface of the frame 105. And, there are disposed two baffles 103 as shown in FIGS. 17 and 18, while the two baffles 103 are driven by a single synchronous motor (not shown) or a stepping motor (not shown) or the like included in the drive mechanism part 104 to thereby open and close the two openings 106 and 106.

Referring to the operations of the two baffles 103 and 103, there are arranged four modes: that is, a first mode in which both of the baffles 103 and 103 are held at their opened positions (opened-opened mode); a second mode in which both of the baffles 103 and 103 are held at their closed positions (closed-closed mode); a third mode in which one baffle 103 is held at its opened position and the other is held at its closed position (opened-closed mode); and, a fourth mode in which one baffle 103 is held at its closed position and the other is held at its opened position (closed-opened mode). By the way, in the present double damper device 111, by driving the drive motor by a predetermined amount, the two baffles 103 can be driven sequentially in the order of the closed-closed mode, opened-closed mode, opened-opened mode, and closed-closed mode.

In the present double damper device 111, since the two baffles 103 and 103 are controlled in temperature while they are positioned and held in the four modes, even when the two baffles 103 are positioned and held only at the two positions, that is, the full opened positions and the full closed positions, as the whole of the refrigerator, the temperature of the refrigerator can be controlled more finely than the single type damper device. Thanks to this, as measures to prevent the interior portion of the refrigerator from being cooled too much, there is no need to position and held the two baffles 103 at their respective intermediate positions.

However, in both of the above-mentioned conventional motor type damper device using a single damper, that is, a single opening/closing member and double damper device 111, there is required a detect mechanism for detecting the position(s) of the baffle(s) 103, which results in the complicated and expensive damper device(s). In view of this, to remove the position detection mechanism from the damper device is sufficiently effective in improving the technological performance of the damper device as well as in reducing the cost of the damper device.

For example, the single damper device can be driven by a stepping motor in such a manner that, in accordance with the number of pulses to be applied to the stepping motor, the device is able to take three positions, namely, a full opened position, a full closed position and an intermediate position; and, the double damper device can be similarly driven by a stepping motor in such a manner that, in accordance with combinations of the pulse number and cam mechanism, the device is able to take four modes, that is, an opened-opened mode, an opened-closed mode, a closed-closed mode, and a closed-opened mode.

However, because such damper devices do not include any position detect mechanism, even if the baffles are shifted in position for some reason or other, the shifted position thereof cannot be detected. For this reason, there arises the need to recognize or initialize the original positions of the baffles with predetermined frequency. In such initialization, in order to move the baffle to the original position thereof forwardly, the baffle is driven with the number of pulses larger than the full step number and is locked mechanically, thereby initializing the initial state of the baffle.

For example, in the motor type or single type damper device, even if the baffle is held at the intermediate position, in the initialization, in order to move the baffle to the original position forwardly, the baffle is driven to in the original position direction with the number of steps larger than the full step number.

Therefore, still after the baffle is butted against the original position, the stepping motor is driven on, so that the baffle can keep its locking state in which it is butted against the opening. However, during such locking operation, not only there can be produced noise but also an abnormal load can be applied onto the gear of the motor.

In the damper device which does not include a position detection mechanism, the above-mentioned initialization is indispensable. However, the noise degrades the commercial value of the damper device and the abnormal load shortens the life of the damper device.

SUMMARY OF THE INVENTION

In view of the above-mentioned problems found in the conventional damper devices, it is an object of the invention to provide a method for driving an opening/closing member which, when driving a motor to thereby initialize the opening/closing member, can reduce the time necessary to lock the opening/closing member mechanically.

According to an aspect of the present invention, there is provided, an opening/closing member driving method for driving and closing a single opening/closing member to open and close an opening part by a drive part, wherein the drive part includes a two-way rotatable motor serving as a drive source for driving the opening/closing member in an opening direction and in a closing direction. Further transmission member transmits the rotation of the motor to the opening/closing member, and can be stopped at a position intermediate the open and closed positions of the opening/closing part. An opening/closing member driving method according to the present invention includes the steps of:

setting an original position wherein the transmission member is moved to the full closed position;

moving the transmission member so that it is stopped at an intermediate position;

driving the transmission member by a predetermined amount in the open direction when it is desired to return the transmission member from an intermediate position to said original closed position;

stopping the transmission member at a position where the transmission member is moved to one of the full open position and in a vicinity of the full open position; and reversely rotating the motor to drive the transmission member toward the closed position so as to return the same to said original position.

According to an opening/closing member driving method of the present invention, after the transmission member is driven in the opposite direction to the original position, the motor is rotated reversely to thereby drive the transmission member toward the original position. This prevents the transmission member and opening/closing member from being locked mechanically at the original position for a long time, so that the opening/closing member can be returned forwardly to the original position. This can reduce noise and abnormal loads caused by the mechanical locking of the transmission member and opening/closing member, which leads to improved quality and extended life of the damper device to be driven by the present drive method.

BRIEF DESCRIPTION OF THE DRAWINGS

FIG. 9 shows a first drive gear employed in the drive part shown in FIG. 7; in particular, FIG. 9(A) is viewed from behind;

FIG. 11 shows a second drive gear employed in the drive part shown in FIG. 10; in particular.

FIG. 12 is a typical view of a first drive gear and a first driven gear respectively employed in the drive part shown in FIG. 7, showing the relation between them; in particular.

FIG. 13 is a typical view of a second drive gear and a second driven gear respectively employed in the drive part shown in FIG. 7, showing the relation between them; in particular.

DETAILED DESCRIPTION OF THE PREFERRED EMBODIMENTS

A method for driving an opening/closing member according to the invention can apply not only to an opening/closing member drive mechanism of a single type which opens and closes an opening part using a single opening/closing member but also to an opening/closing member drive mechanism of a double type which opens and closes two openings using two opening/closing members respectively to be driven by a single drive source and also which is capable of holding the two opening/closing members in one of four modes: that is, an opened-opened mode in which both of the two opening/closing members are held at their opened positions; a closed-closed mode in which both of the two opening/closing members are held at their closed positions; an opened-closed mode in which one of the two opening/closing members is held at its opened position and the other is held at its closed position; and, a closed-opened mode in which one of the two opening/closing members is held at its opened position and the other is held at its closed position.

First Embodiment

At first, description will be set forth below of a first embodiment of the invention in which an opening/closing member driving method according to the invention is applied to a motor type damper device 1 as a single type opening/closing member drive mechanism. By the way, the motor type damper device 1 according to the first embodiment of the invention is used in a refrigerator.

Figure 1:
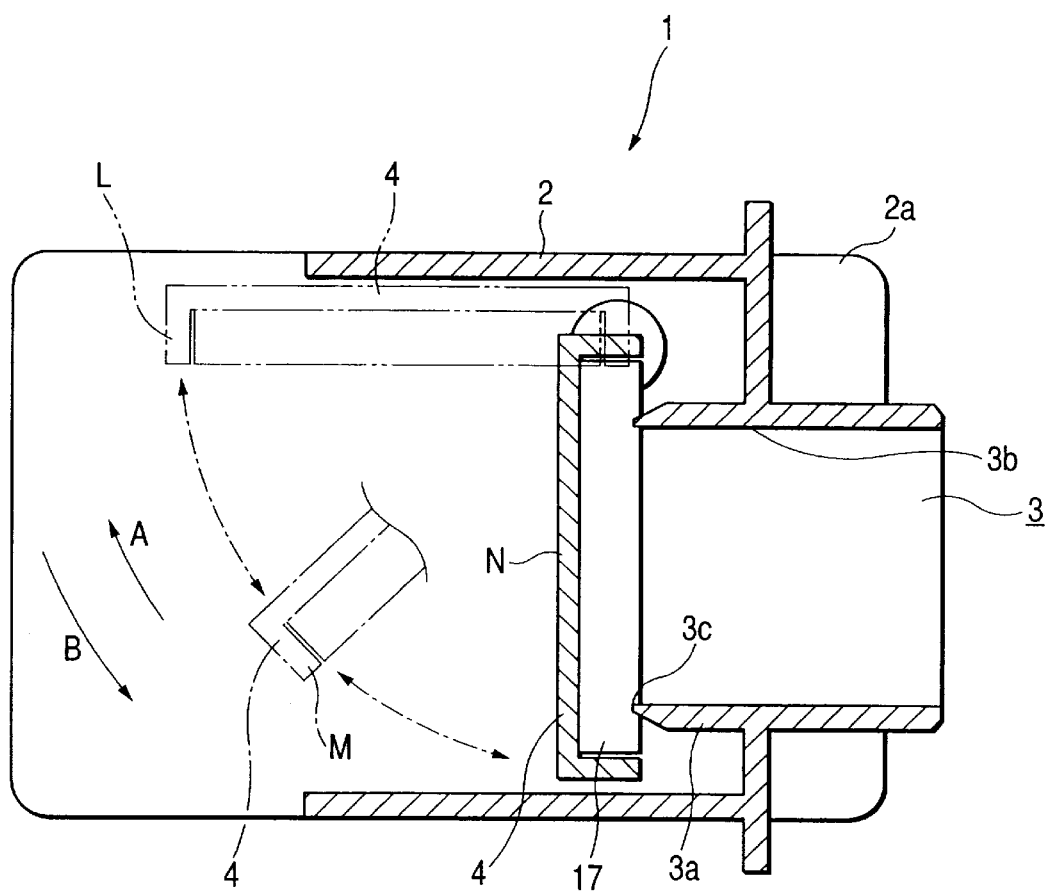
FIG. 1 is shows a single type or motor type damper device which is controlled by an opening/closing driving method according the invention, in particular, a section view of a motor type damper device shown in FIG. 2 taken along the line I—I.
Figure 2:
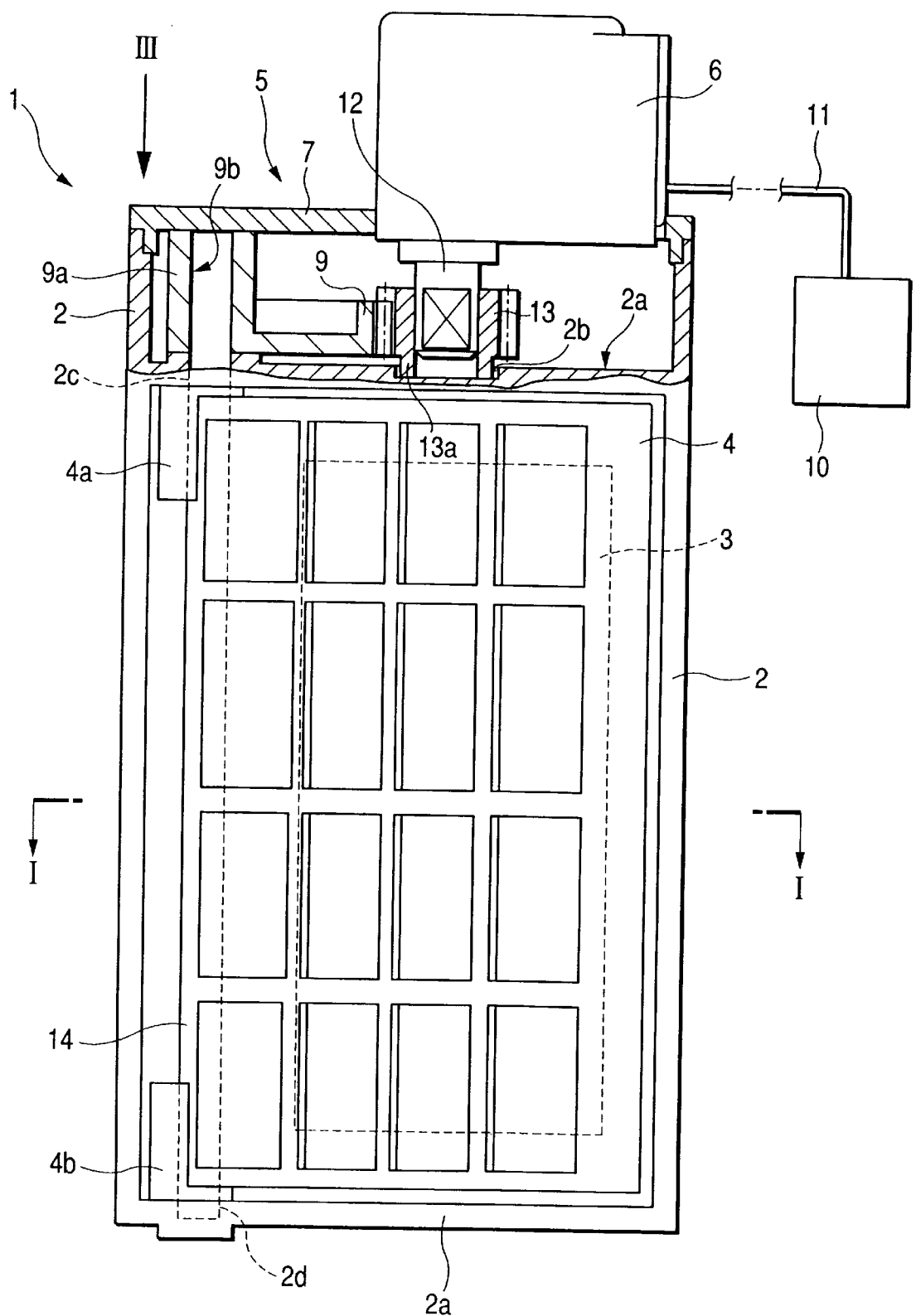
FIG. 2 is a partially sectional view of the whole of a single type or motor type damper device which is controlled by an opening/closing driving method according the invention.

The motor type damper device 1, as shown in FIGS. 1 and 2, consists mainly of a cylindrical-shaped frame 2 with the two ends thereof opened, an opening part 3 formed in the frame 2, a baffle 4 serving as an opening/closing member for opening and closing the opening part 3, and a drive part 5 for driving the baffle 4.

The drive part 5 consists mainly of a stepping motor 6 serving as a two-way rotatable drive source for driving the baffle 4 in an opening direction and in a closing direction, a cup-shaped case body 7 with the stepping motor 6 fixed to the outside portion thereof, and a fan-shaped gear 9 serving as a transmission member for transmitting the rotation of the stepping motor 6 to the baffle 4.

The stepping motor 6 is connected to a microcomputer 10 through a lead wire 11. The microcomputer 10 serves as stepping motor control means which applies a predetermined number of pulses to the stepping motor 6 and thereby energizes the same electrically to thereby be able to drive the stepping motor 6 by a predetermined drive amount, that is, by a predetermined number of steps. By the way, due to the fact that the stepping motor 6 is driven by a predetermined number of steps by the microcomputer 10, as will be discussed later, the baffle 4 can be driven up to a predetermined position. Also, since the microcomputer 10 is structured in such a manner as to be able to recognize the number of pulses to be applied to the stepping motor 6, the microcomputer 10 also serves as position recognition means for assuming the rotation position of the baffle 4 as an opening/closing member.

Figure 3:
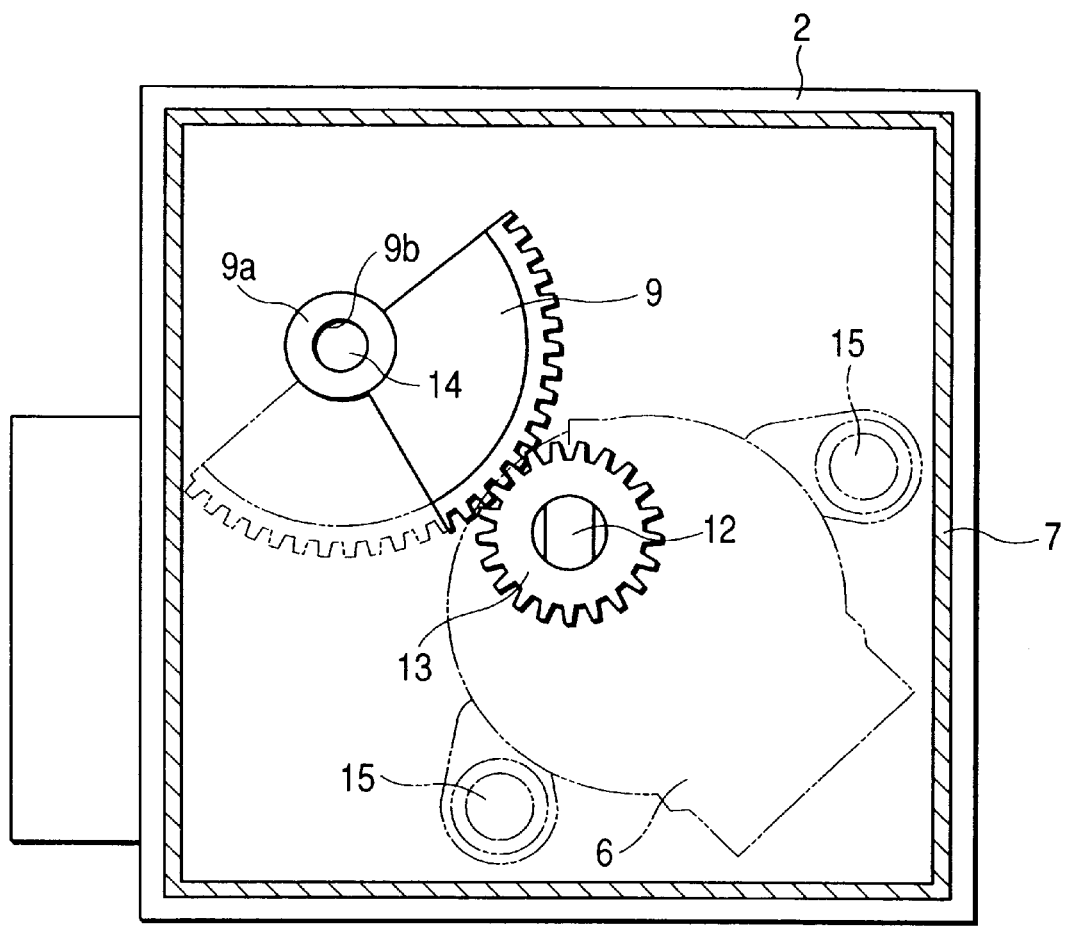
FIG. 3 is a section view of the drive part of the motor type damper device shown in FIG. 2, when viewed from the arrow line III in FIG. 2.

The stepping motor 6 includes an output shaft 12 which is structured in such a manner as to project inwardly of the case body 7 and, with the output shaft 12, there is fitted a pinion 13 which is formed of polyacetal (which is hereinafter referred to as POM). Also, the shaft end portion 13a of the pinion 13 located on the opposite side to the stepping motor 6 is supported in a bearing-support manner by a recessed portion 2b formed in one side wall 2a of the frame 2. The pinion 13, as shown in FIG. 3, is in meshing engagement with the fan-shaped gear 9 formed of POM and transmits the rotation of the stepping motor 6 to the fan-shaped gear 9 in a reduced manner. The fan-shaped gear 9 serves as a transmission member which is used to transmit the rotation of the stepping motor 6 to the baffle 4. That is, a shaft 14 is in fit with a through hole 9b formed in the rotation center portion 9a of the fan-shaped gear 9, so that the rotation of the fan-shaped gear 9 can be transmitted to the shaft portion 4a of the baffle 4. Also, the case body 7 is fitted with the frame 2 in such a manner as to cover the output shaft 12 projected from the stepping motor 6, pinion 13, fan-shaped gear 9, and shaft 14, and the case body 7 is also mounted on the frame 2 by screws 15 and 15.

The frame 2 is formed in a quadratic prism shape having a small thickness, while the frame 2 includes two side walls 2a which are respectively used to support the shaft 14 rotatable integrally with the baffle 4. By the way, in the side wall 2a of the frame 2 on the drive part 5 side thereof, there is formed a through hole 2c through which the shaft 14 can be inserted. And, in the interior portion of the frame 2, not only there is formed an opening part 3 but also there are stored the shaft portions 4a and 4b of the baffle 4. On the other hand, the other end side of the shaft 14 is fitted into a bottomed hole 2d formed in the side wall 2a and is supported in a rotatable manner.

Now, the opening part 3 is formed in such a manner that an opening forming portion 3a projecting in parallel to the frame 2 encloses the periphery of an opening 3b. And, one end side of the opening forming portion 3a provides a projecting portion 3c which can be butted against the baffle 4. By the way, in the present embodiment, the opening part 3 is formed integrally with the frame 2. However, the opening part 3 may also be formed as a separate member.

To the opening part 3 side of the baffle 4, there is fixed soft tape 17 which serves as a buffer member and also forms part of the baffle 4. By the way, on the back surface side of the baffle 4, in order to maintain the strength of the baffle 4, a rib may also be provided. As the material of the soft tape 17, in order that the soft tape 17 can sink greatly when it is butted against the projecting portion 3c, there is used polyurethane foam. However, the soft tape 17 may also be formed of other elastic material such as polyethylene foam, rubber material or the like.

The baffle 4 is structured such that it can be rotated about the shaft 14 inserted through and fixed to the shaft portions 4a and 4b of the baffle 4; that is, the baffle 4 can be moved in an opening direction A or in a closing direction B between its full opened position L shown by a two-dot chained line and its full closed position N shown by a solid line respectively in FIG. 1. By the way, if the baffle 4 is rotated in the opening direction A, then it is butted against the frame 2 at the full opened position L, with the result that the fan-shaped gear 9 for rotating the baffle 4 is mechanically locked and is thereby stopped there. Therefore, the full opened position L of the baffle 4 provides a position where the fan-shaped gear 9 serving as a transmission member is moved to the full in the opening direction. Also, if the baffle 4 is rotated in the closing direction, then it is butted against the projecting portion 3c of the opening part 3 at the full closed position N, with the result that the fan-shaped gear 9 for rotating the baffle 4 is mechanically locked and is thereby stopped there.

That is, the full closed position L of the baffle 4 provides a position where the fan-shaped gear 9 serving as a transmission member is moved to the full in the closing direction. Generally, as the original position of a rotating member, there is arbitrarily used one of the two positions where the rotating member is mechanically locked. In the present or first embodiment of the invention, the position providing the full closed position N of the fan-shaped gear 9 is used as the original position thereof.

By the way, of course, as the original position of the fan-shaped gear 9, the position thereof on the opposite side to the full closed position N, that is, the full opened position L of the fan-shaped gear 9 can also be employed.

By the way, when the present motor type damper device 1 is installed in a refrigerator 21 to be discussed later, if the baffle 4 is rotated up to the full opened position L and is held at this position, then the cool air to be sent from an evaporator 25 (see FIG. 4) is allowed to flow in the direction of a vegetable compartment 24 with no obstacles at all, which causes the vegetable compartment 24 to be cooled excessively. In view of this, in the present or first embodiment, by controlling and driving the stepping motor 6 by the microcomputer 10, the baffle 4 can be driven in the opening direction A up to an intermediate position M shown by a one-dot chained line in FIG. 1 and can be stopped at the intermediate position M. The position holding of the baffle 4 at the then time is executed by the magnetic detent torque of the stepping motor 6.

Figure 4:
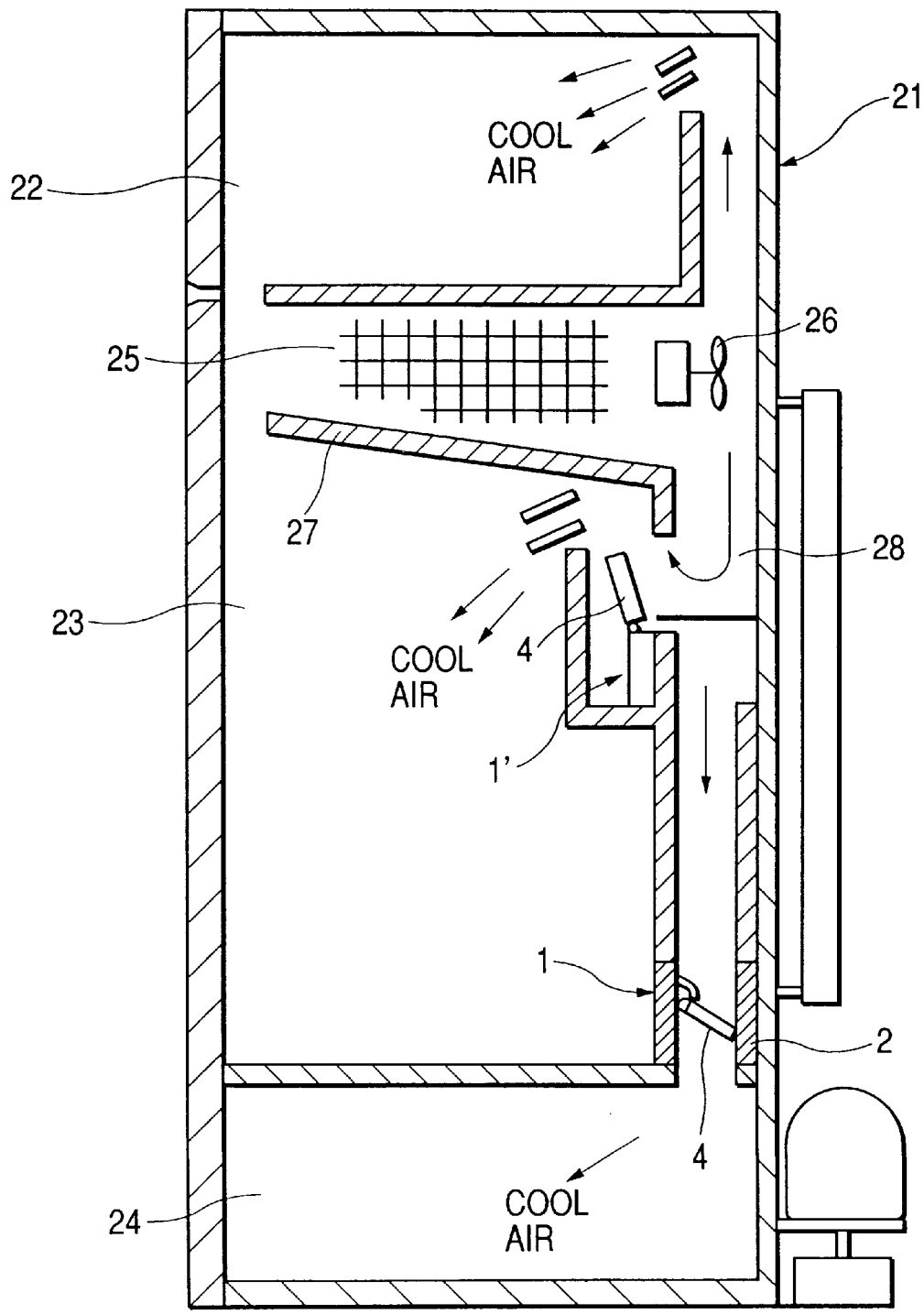
FIG. 4 is a longitudinal section view of the whole of a refrigerator in which the motor type damper device shown in FIG. 2 is incorporated.

And, the thus structured motor type damper device 1 is assembled into the refrigerator 21, for example, in such a manner as shown in FIG. 4. That is, the refrigerator 21 is divided into a freezing compartment 23, a refrigerating compartment 22, and a vegetable compartment 24; and, in the bottom portion of the freezing compartment 22, there is disposed the evaporator 25. In the rear portion of the evaporator 25, there is disposed a fan motor 26 which is used to send and circulate the cool air obtained in the evaporator 25 to the freezing compartment 22, refrigerating compartment 23 and vegetable compartment 24.

And, between the evaporator 25 and refrigerating compartment 23, there is interposed a partition plate 27 which shields the cool air of the evaporator 25 from flowing directly into the refrigerating compartment 23. On the other hand, between the rear portion of the partition plate 27 and the rear inner wall of the refrigerator 21, there is interposed a cool air flow passage 28, while the motor type damper device 1 is fitted into the portion of the cool air flow passage 28 that communicates with the vegetable compartment 24. That is, the motor type damper device 1 is fitted into the portion of the cool air flow passage 28 in such a manner that the frame 2 of the motor type damper device 1 forms a portion of the cool air flow passage 28, with the result that the motor type damper device 1 itself is also used as the cool air flow passage 28. Also, on the back surface side of the refrigerating compartment 23, there is disposed a second motor type damper device 1' as well.

That is, in the first embodiment, there are employed two motor type damper devices 1 and 1'. By the way, the motor type damper device 1 may not be installed in both of the refrigerating compartment 23 and vegetable compartment 24 but may be installed only in one of them; or, the motor type damper device 1 may be mounted in such a manner that it can be used for the freezing compartment 22; or one motor type damper device 1 may be mounted in each of the compartments of the refrigerator.

Next, description will be set forth below of the operation of the above-mentioned motor type damper device 1.

At first, the first initialization of the motor type damper device 1 is executed in the following manner. That is, after the motor type damper device 1 is incorporated into the refrigerator 21, by driving the stepping motor 6 in a full step manner, the fan-shaped gear 9 serving as a transmission member is rotated to thereby rotate the baffle 4 in the closing direction B. The number of steps to be applied to the stepping motor 6 at the then time is set as the number of steps that allows the baffle 4 to rotate from the full opened position L to the full closed position N. Due to this, the baffle 4 is to be mechanically locked at the full closed position N while it is butted against the projecting portion 3c of the opening part 3. On the other hand, from the stepping motor 6, there is output an extra drive signal. If the microcomputer 10 detects this extra drive signal, then the motor type damper device 1 is able to recognize that the baffle 4 is held at the full closed position N, that is, the fan-shaped gear 9 has been returned to the original position thereof.

When the motor type damper device 1 is initialized in this manner, the microcomputer 10 gives the motor type damper device 1 an instruction to introduce the cool air therein. In particular, the microcomputer 10 gives a predetermined number of pulses to the stepping motor 6 to thereby energize it electrically. In response to this, the stepping motor 6 is driven in the forward direction by an amount equivalent to the predetermined number of pulses. Due to this, the rotation of the stepping motor 6 is transmitted to the baffle 4 through the pinion 13, fan-shaped gear 9, shaft 14, and shaft portions 4a, 4b. As a result of this, the baffle 4 is moved apart from the opening part 3, that is, it is moved from the full closed position N up to a predetermined intermediate position M (see a one-dot chained line in FIG. 1). At the then time, the microcomputer 10 recognizes the number of steps used to drive the stepping motor 6 to thereby be able to assume that the rotation position of the baffle 4 is the predetermined intermediate position M.

By the way, if it is assumed that the predetermined intermediate position M of the baffle 4 is set for an angle of 45°, then the number of steps of the stepping motor 6 used to drive the baffle 4 from the full closed position N up to the predetermined intermediate position M can be set variously. For example, it is here assumed that, if the stepping motor 6 is driven in such a manner that the number of full steps of the stepping motor 6 is set for 2400, then the baffle 4 is driven by an amount equivalent to the full angles thereof ranging from the full closed position N to the full opened position L.

In this assumption, if the stepping motor 6 is driven by 1200 steps which is one half of the number of full steps, then the stepping motor 6 is caused to stop. At the then time, the baffle 4 is positioned and held at the intermediate position M (an open angle of 45° due to the detent torque that is produced in the thus stopped stepping motor 6. As a result of this, the cool air cooled in the evaporator 25 can be sent to the compartment to which the cool air should be supplied, for example, the vegetable compartment 24.

By the way, when the vegetable compartment 24 is sufficiently cooled down to the desired temperature and thus the baffle 4 is to be closed in order to prevent the vegetable compartment 24 from being cooled any further, theoretically, if the stepping motor 6 is driven in the opposite direction to the above-mentioned opening direction A, that is, in the closing direction B by a step number equivalent to the above-mentioned predetermined step number, namely, 1200, to thereby rotate the baffle 4, then the baffle 4 can be moved to the full closed position N almost without causing the fan-shaped gear 9 to be mechanically locked. In fact, however, since the baffle 4 is positioned and held simply by the detent torque of the stepping motor 6, there is a possibility that the baffle 4 can be moved out of the intermediate position M for one reason or another, for example, because, when a repairman touches the interior portion of the refrigerator to repair the same, the repairman moves the baffle 4 in error. That is, there can occur a case in which the actual rotation position of the baffle 4 is deviated from the rotation position of the baffle 4 assumed by the microcomputer 10.

For example, it is assumed here that, after the baffle 4 is moved to and stopped at the intermediate position M under the control of the microcomputer 10, the baffle 4 is further moved by a slight amount from the intermediate position M in the opening direction A. In this case, even if the stepping motor 6 is driven in the reverse direction by 1200 steps in order to drive the baffle 4 in the closing direction B, the baffle 4 is actually stopped before the full closed position N so that the opening part 3 is still opened slightly. In this state, the cool air leaks in the opening part 3, which must not be allowed to occur.

Therefore, in order to be able to cope with such problem, there may be employed the following method: that is, when closing the baffle 4, the stepping motor 6 is always driven in the reverse direction with the number of steps necessary to drive the baffle 4 over the whole angle ranging from the full opened position L to the full closed position N, that is, with the full steps, namely, 2400 steps, thereby moving the baffle 4 up to the full closed position N forwardly; and, at the same time, the fan-shaped gear 9 is mechanically locked to thereby re-recognize the rotation position of the baffle 4 (that is, re-initialization=return to the original position).

Also, there can occur a case in which, when the baffle 4 is held at the intermediate position M, the motor type damper device 1 can be re-initialized. In such case as well, there may be employed a method in which the stepping motor 6 is driven with 2400 steps in consideration of the possibility of the deviation of the position of the baffle 4.

However, with use of the above-mentioned opening/closing member or baffle driving method, when the baffle 4 is stopped at the normal position, that is, at the predetermined intermediate position M and is then driven to the full from the normal position in the closing direction B, the baffle 4 is mechanically locked at the full closed position N by an amount equivalent to 1200 steps.

Due to this, in the motor type damper device 1, when closing the baffle 4 or initializing the motor type damper device 1, mechanical noise and abnormal loads are generated for a long period of time equivalent to 1200 steps due to the above-mentioned mechanical locking of the baffle 4.

The opening/closing member driving method according to the invention aims at shortening such mechanical locking time. Accordingly, description will be set forth below of the present opening/closing member driving method.

Now, as the microcomputer 10 gives a predetermined number of pulses to the stepping motor 6 to thereby energize the stepping motor 6 electrically, the baffle 4 is moved from the full closed position N up to the predetermined intermediate position M (see a one-dot chained line shown in FIG. 1) and is positioned and held there. The microcomputer 10 assumes the present rotation position of the baffle 4 by recognizing the number of steps used by the stepping motor 6.

When the microcomputer 10 recognizes that the baffle 4 must be closed because the temperature of the interior of the refrigerator is lowered, or judges that the motor type damper device 1 must be initialized for some reason or other, the microcomputer 10 controls and drives the motor type damper device 1 in such a manner as to move the baffle 4 to the full closed position N. In this case, the microcomputer 10 firstly gives a predetermined number of pulses to the stepping motor 6 to thereby energize the stepping motor 6 electrically so that the baffle 4 can be driven in the opening direction A and can be stopped at the full opened position L. That is, the microcomputer 10 controls the stepping motor 6 such that, in order to be able to move the baffle 4 from the intermediate position M to the full opened position L, the stepping motor 6 drives the baffle 4 in the forward direction by an amount equivalent to 1200 steps which are steps including some extra steps. In this control, the microcomputer 10 recognizes that the baffle 4 is driven in the opening direction A by an amount equivalent to a total of 2400 steps from the original position, thereby assuming that the rotation position of the baffle 4 lies at the full opened position L.

Next, the microcomputer 10 applies a predetermined number of pulses to the stepping motor 6 to thereby energize it electrically so that the baffle 4 is allowed to move in the closing direction B over the whole angle range thereof from the full opened position L to the full closed position N. In response to this, the stepping motor 6 drives the baffle 4 in the reverse direction by an amount equivalent to the number of steps including several extra steps, that is, full steps or 2400 steps to thereby be able to move the baffle 4 from the full opened position L to the full closed position N. As a result of this, the baffle 4 is moved from the full opened position L to the full closed position N. In this movement, while the baffle 4 is sure to return to the original position, the baffle 4 is not locked mechanically for a long time because the full steps include only the several extra steps. By the way, when driving the baffle 4 to move to the full closed position N, because the baffle 4 is pressed against the projecting portion 3c of the opening part 3 to thereby sink the soft tape 17, if the baffle 4 is slightly overstepped, then the baffle 4 is locked mechanically to the extent that corresponds to such overstepping or the number of extra steps.

If the baffle 4 is returned to the original position according to the above-mentioned driving method, then the opening part 3 can be open forwardly by the baffle 4 even if the baffle 4 is caused to move in the opening direction A or in the closing direction B for some reason or other while it is positioned and held at the intermediate position M. That is, in initializing the baffle 4 from the position to which it is moved from the intermediate position M, when the baffle 4 is moved toward the full closed position from the intermediate position M, the baffle 4 is mechanically locked at the full opened position L for the time that is longer than the normal time by an amount equivalent to the above-mentioned movement of the baffle 4. On the contrary, when the baffle 4 is moved from the intermediate position M toward the full closed position, the baffle 4 is not allowed to arrive at the full opened position but it is mechanically locked at the full closed position N for the time that is longer than the normal time by an amount equivalent to the number of steps corresponding to the unarrival or short distance of the baffle 4. However, since the baffle 4 is locked mechanically only by such extra steps, such mechanical locking can be neglected. Also, in the normal case in which the baffle 4 is situated at the normal intermediate position M, the baffle 4 is mechanically locked at the full opened position L and at the full closed position N for the time that has been previously set as the normal time. By the way, when driving the baffle 4 in the opposite direction to the original position, that is, in the present embodiment, when driving the baffle 4 toward the full opened position L, the microcomputer 10 controls the stepping motor 6 in such a manner that the baffle 4 is overstepped slightly. However, alternatively, the baffle 4 may also be stopped in the neighborhood of the full opened position L.

Also, in the above-mentioned first embodiment, as the original position of the baffle 4, there is employed the position of the baffle 4 when the baffle 4 is moved to and held at the full closed position N. However, for this purpose, the position of the baffle 4 when the baffle 4 is moved to and held at the full opened position L can also be employed as the original position of the baffle 4. Further, in the above embodiment, when moving the baffle 4 from the intermediate position M to the full closed position N, the baffle 4 is always driven once in the opposite direction to such movement. However, it is also possible to employ another driving method: that is, only when initializing the baffle 4 periodically or for a predetermined reason, the baffle 4 is driven in the opposite direction and, in the normal operation, the baffle 4 is returned directly from the intermediate position M to the full closed position N. In addition, in both of the initialization and normal driving, the above-mentioned driving method according to the invention can also be employed.

Second Embodiment

Next, description will be predetermined below of a second embodiment of an opening/closing member driving method according to the invention, in which the present driving method is applied to a double damper device 31 as a drive mechanism for driving a double type of opening/closing member, with reference to FIGS. 5 to 16. By the way, the double damper device 31 according to the second embodiment of the invention, similarly to the motor type damper device 1 according to the first embodiment of the invention, is used in a refrigerator and provides a motor type damper device which can be driven by a motor.

Figure 5:
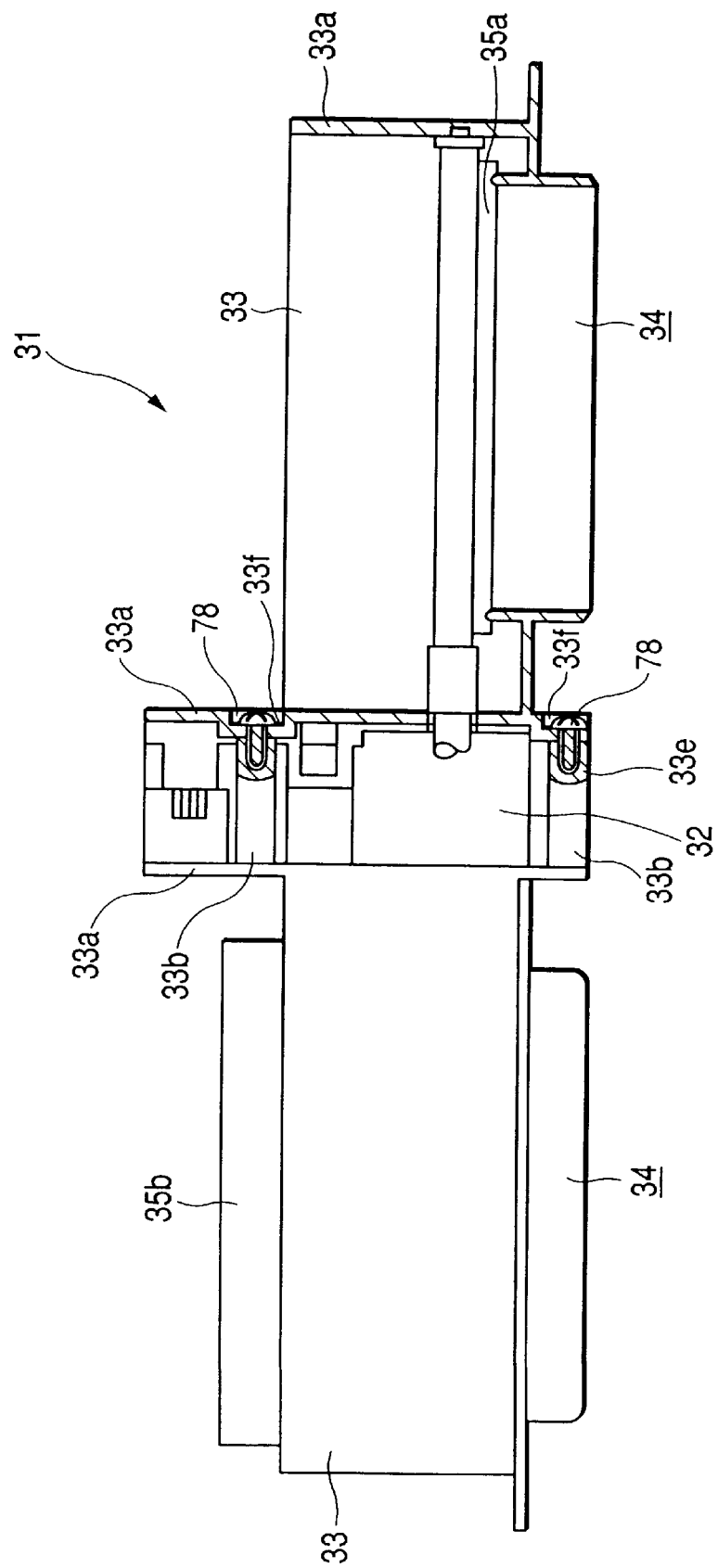
FIG. 5 is a partially sectional plan view of a double damper device to be controlled by the opening/closing driving method according the invention, when viewed from above the double damper device.
Figure 6:
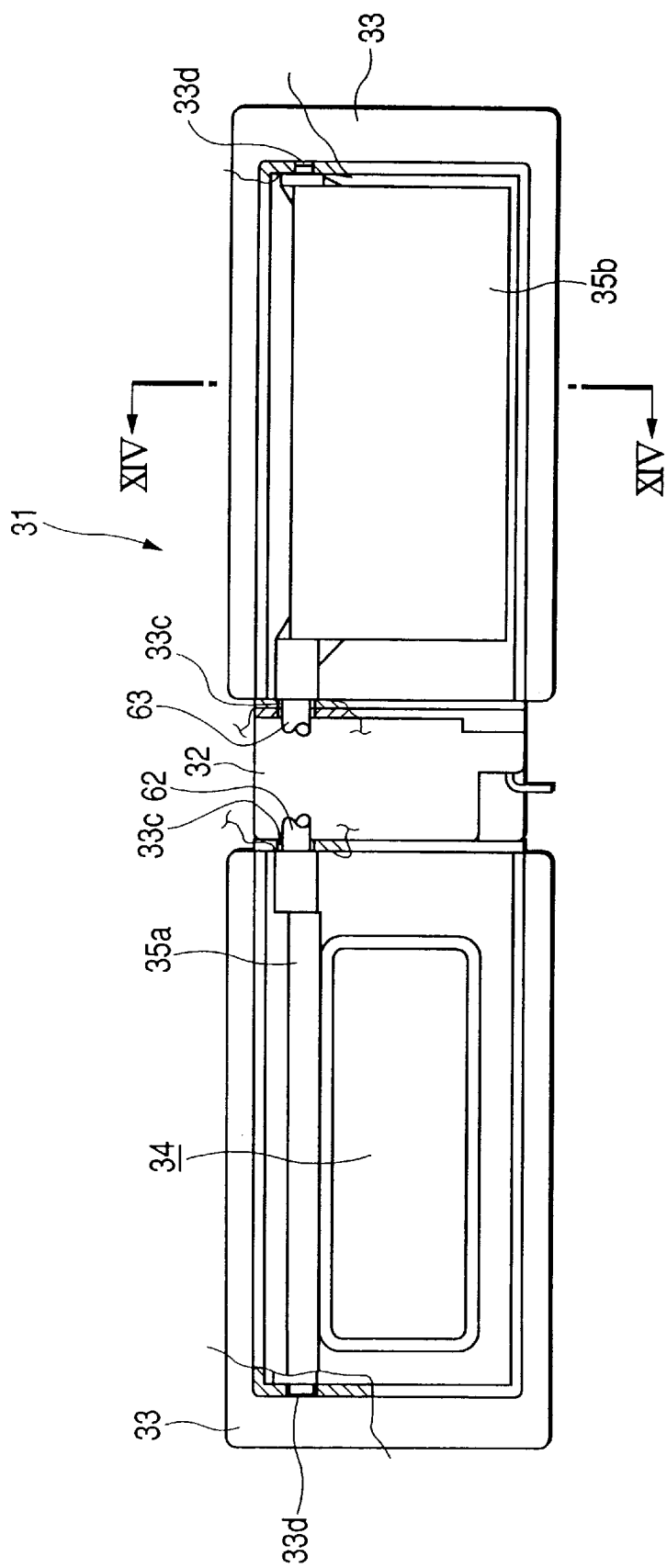
FIG. 6 is a front view of the double damper device shown in FIG. 5, showing a state thereof in which a left baffle is held at its opened position and a right baffle is held at its closed position.

The present double damper device 31, as shown in FIGS. 5 and 6, consists mainly of a drive part 32, two frames 33 and 33 respectively disposed on the two sides of the drive part 32, two opening parts 34 and 34 respectively formed in the two frames 33 and 33, and two baffles 35*a* and 35*a* respectively serving as two opening/closing members respectively for opening and closing the two opening parts 34 and 34.

Figure 7:
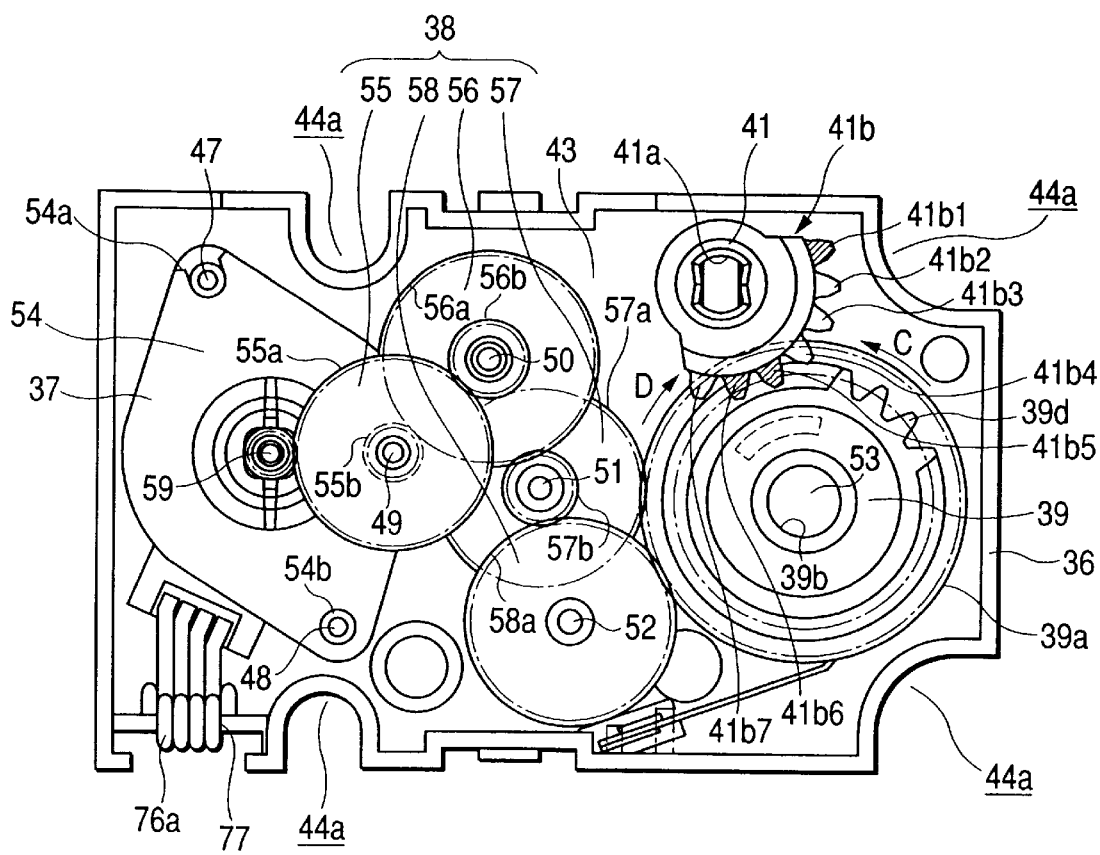
FIG. 7 is a plan view of the internal structure of the double damper device shown in FIG. 5.
Figure 8:
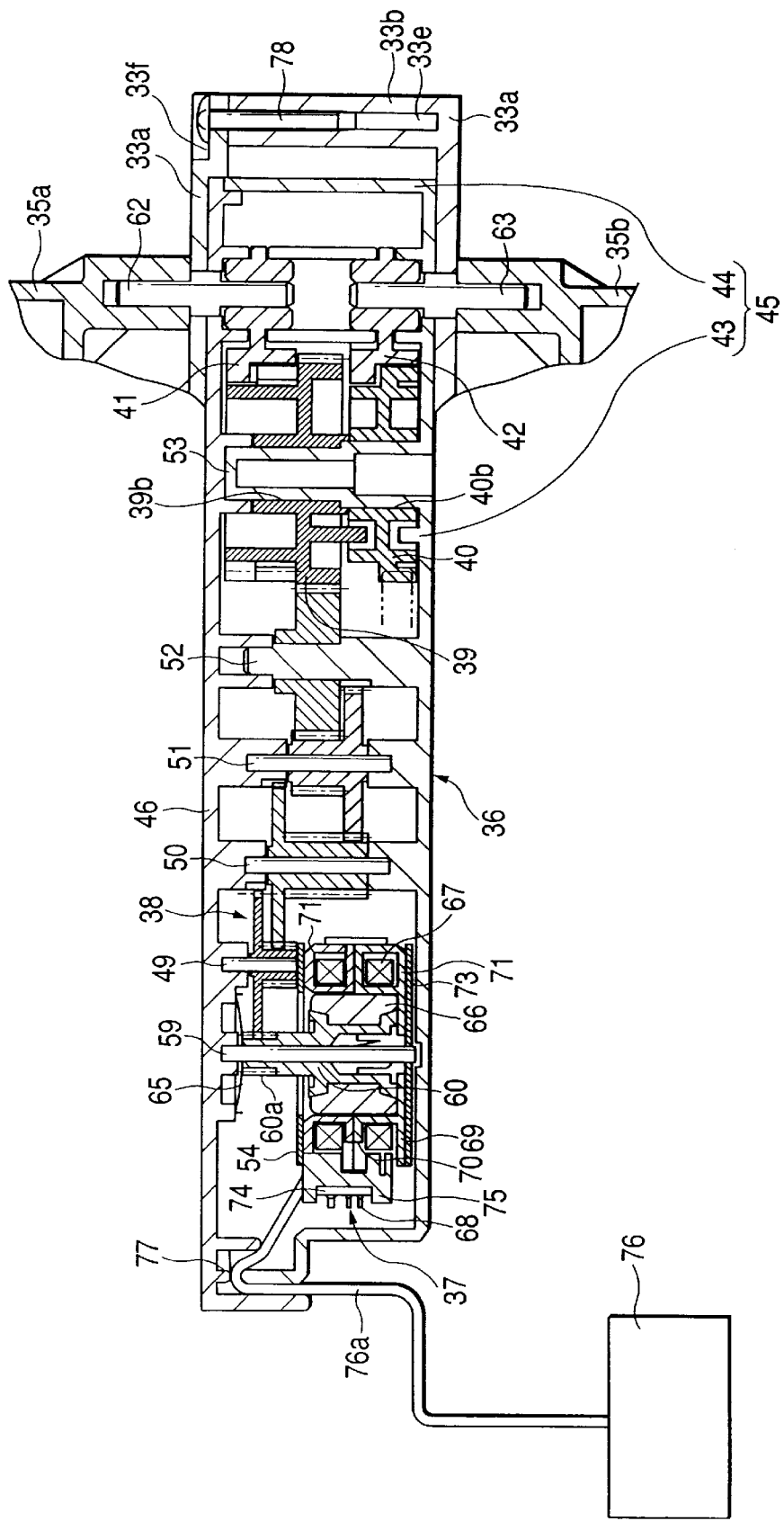
FIG. 8 is a developed longitudinal section view of the drive part shown in FIG. 7.

And, the drive part 32 is used to drive the two baffles 35*a* and 35*a* and, as shown in FIGS. 7 and 8, consists mainly of a case body 36, a stepping motor 37 fixedly disposed within the case body 36 and serving as a drive source which can be rotated in two directions, a train of reduction gears 38 which are used to reduce and transmit the rotation of the stepping motor 37, a first drive gear 39 serving as a transmission member for transmitting the rotation of the stepping motor 37 to the two baffles 35*a* and 35*a*, a second drive gear 40 rotatable integrally with the first drive gear 39 in a predetermined area, and a first driven gear 41 and a second driven gear 42 respectively serving as driven members which can be rotated following the rotation of the first drive gear 39 respectively in different areas.

The case body 36 comprises a cup-shaped member 45 including a bottom surface portion 43 and a side wall portion 44 formed in such a manner as to extend from the outer peripheral end portion of the bottom surface portion 43 in the vertical direction of the bottom surface portion 43, and a cover member 46 fixed in such a manner as to cover the opened portion of the cup-shaped member 45.

By the way, at four positions in the side wall portion 44 of the case body 36, there are formed four recessed portions 44*a* which are respectively hollowed inwardly of the case body 36. The recessed portions 44a respectively provide passage spaces through which four fixing shafts 33*b* projected out from the side walls 33*a* of one frame 33 can be contacted with the other frame 33 side (see FIG. 5).

Also, within the case body 36, there are erected a plurality of fixed shafts 47, 48, 49, 50, 51, 52, and 53. Among the fixed shafts, the fixed shafts 47 and 48 are shafts which are provided integrally with the case body 36 and each of which includes in the leading end portion thereof a stepped portion where the shaft is switched in diameter from a large thickness to a small thickness.

And, the two fixed shafts 47 and 48 are used to position the stepping motor 37; and, a base plate 54 fixed to the upper surface of the stepping motor 37 is placed on the above-mentioned stepped portions of the fixed shafts 47 and 48 and, at the same time, the fixed shafts 47 and 48 are inserted into a notch 54*a* and a hole 54*b* respectively formed in the base plate 54. Also, the fixed shaft 49 is a shaft which is provided erectly on the base plate 54; the fixed shafts 50 and 51 are shafts which are respectively inserted into and fixed to the bottom surface portion 43 of the case body 36; and, the fixed shafts 52 and 53 are shafts which are respectively provided on the bottom surface portion 43 integrally therewith.

And, a first reduction gear 55, a second reduction gear 56, a third reduction gear 57 and a fourth reduction gear 58 respectively belonging to the above-mentioned reduction gear train 38 are rotatably supported on the fixed shafts 49, 50, 51 and 52, respectively. Also, on the fixed shaft 53, there are rotatably supported the first and second drive gears 39 and 40. That is, the first and second drive gears 39 and 40 are disposed on the same shaft in a superimposed manner.

Also, the stepping motor 37 is structured as a drive source which can be rotated in two directions so as to drive the baffles 35*a* and 35*a* used as the opening/closing members in their opening and closing directions, while the rotation of the stepping motor 37 is reduced by the reduction gear train 38 and is then transmitted to the first drive gear 39. That is, the stepping motor 37 includes a fixed shaft 59, while a rotor 60 including a pinion 60*a* is rotatably fitted with the fixed shaft 59.

Also, the pinion 60*a* is meshing engagement with the teeth portion 55*a* of the first reduction gear 55, while the pinion portion 55*b* of the first reduction gear 55 is in meshing engagement with the teeth portion 56*a* of the second reduction gear 56. And, the pinion 56*a* of the second reduction gear 56 is in meshing engagement with the teeth portion 57*a* of the third reduction gear 57, while the pinion portion 57*b* of the third reduction gear 57 is in meshing engagement with the teeth portion 58*a* of the fourth reduction gear 58. Further, the teeth portion 58*a* of the fourth reduction gear 58 is in meshing engagement with the driven teeth portion 39*a* of the first drive gear 39. That is, the reduction gear train 38 reduces the rotation of the stepping motor 37 and transmits the same to the first drive gear 39 through the above-mentioned arrangement.

Figure 9A:
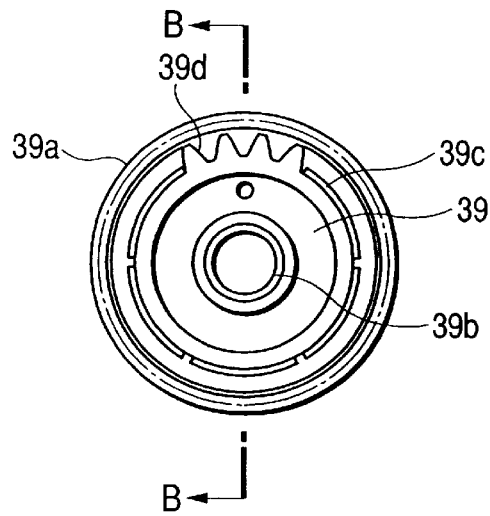
FIG. 9(A) is a front view thereof.
Figure 9B:
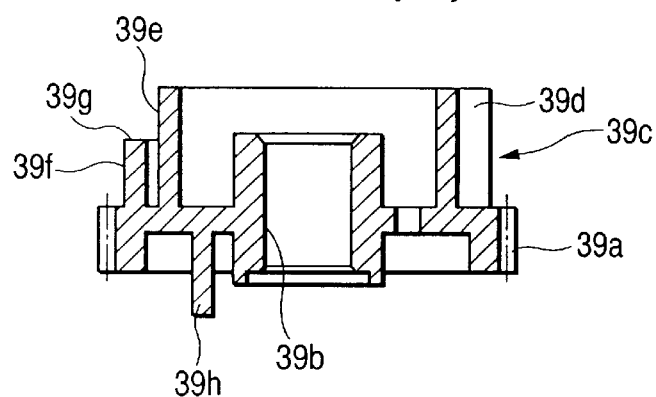
FIG. 9(B) is a section view thereof taken along the arrow line B—B shown in FIG. 9(A)

With the fitting hole 39*b* of the first drive gear 39 fitted with the fixed shaft 53, the first drive gear 39 is rotatably supported on the case body 36. Referring here to the structure of the first drive gear 39, as shown in FIGS. 9(A) and (B), the axially lower side of the first drive gear 39 is formed as a driven teeth portion 39*a* which can be meshingly engaged with the teeth portion 58*a* of the fourth reduction gear 58, whereas the axially upper side thereof is formed as an intermittent teeth portion 39*c* which is used to feed the first driven gear 41 intermittently. The driven teeth portion 39*a* is structured such that teeth are formed on the whole periphery of the outer peripheral end portion thereof, while the drive force of the stepping motor 37 reduced by the reduction gear train 38 can always be transmitted to the driven teeth portion 39*a*.

The intermittent teeth portion 39*c* includes a feed teeth portion 39*d* which can be engaged with the first driven gear 41 only in a predetermined area. Due to this, if the first drive gear 39 is rotated, then only a predetermined area of rotation of the first drive gear 39 can be transmitted to the first driven gear 41. By the way, the second driven gear 42, which will be discussed later, is allowed to follow the rotation of the first drive gear 39 in a different area from the first driven gear 42. Also, the remaining portion of the intermittent teeth portion 39*c* includes two outer peripheries different in diameter; and, in particular, the upper stage thereof is a small diameter portion 39*e* which is formed in such a manner as to have a diameter equal to the diameter of the root portion of the feed teeth portion 39*d*, whereas the lower state thereof is a large diameter portion 39*f* which is formed in such a manner as to have a diameter equal to the diameter of the crest portion of the feed teeth portion 39*d*. And, a portion interposed between the small diameter portion 39*e* and large diameter portion 39*f* is formed as a stepped portion 39*g*.

Figure 9C:
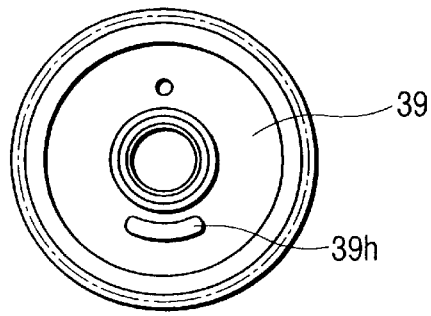
FIG. 9(C) is a view thereof when

Also, the first drive gear 39, as described above, is superimposed on the second drive gear 40 on the same shaft and is also disposed on the upper side of the shaft, that is, on the cover member 46 side of the case body 36. On the surface of the first drive gear 39 on the opposed side to the second drive gear 40, that is, on the lower side surface thereof, as shown in FIG. 9(C), there is provided an engaging projecting piece 39*h*. This engaging projecting piece 39*h* provides an engaging portion which can be intermittently engaged with an engaging projecting piece 40*a* provided on the second drive gear 40, and the engaging projecting piece 39*h* is formed in an arc shape which has a predetermined length of width in the peripheral direction of the first drive gear 39 in the intermediate portion thereof existing between the rotation center of the first drive gear 39 and the outer peripheral end thereof.

Figure 10:
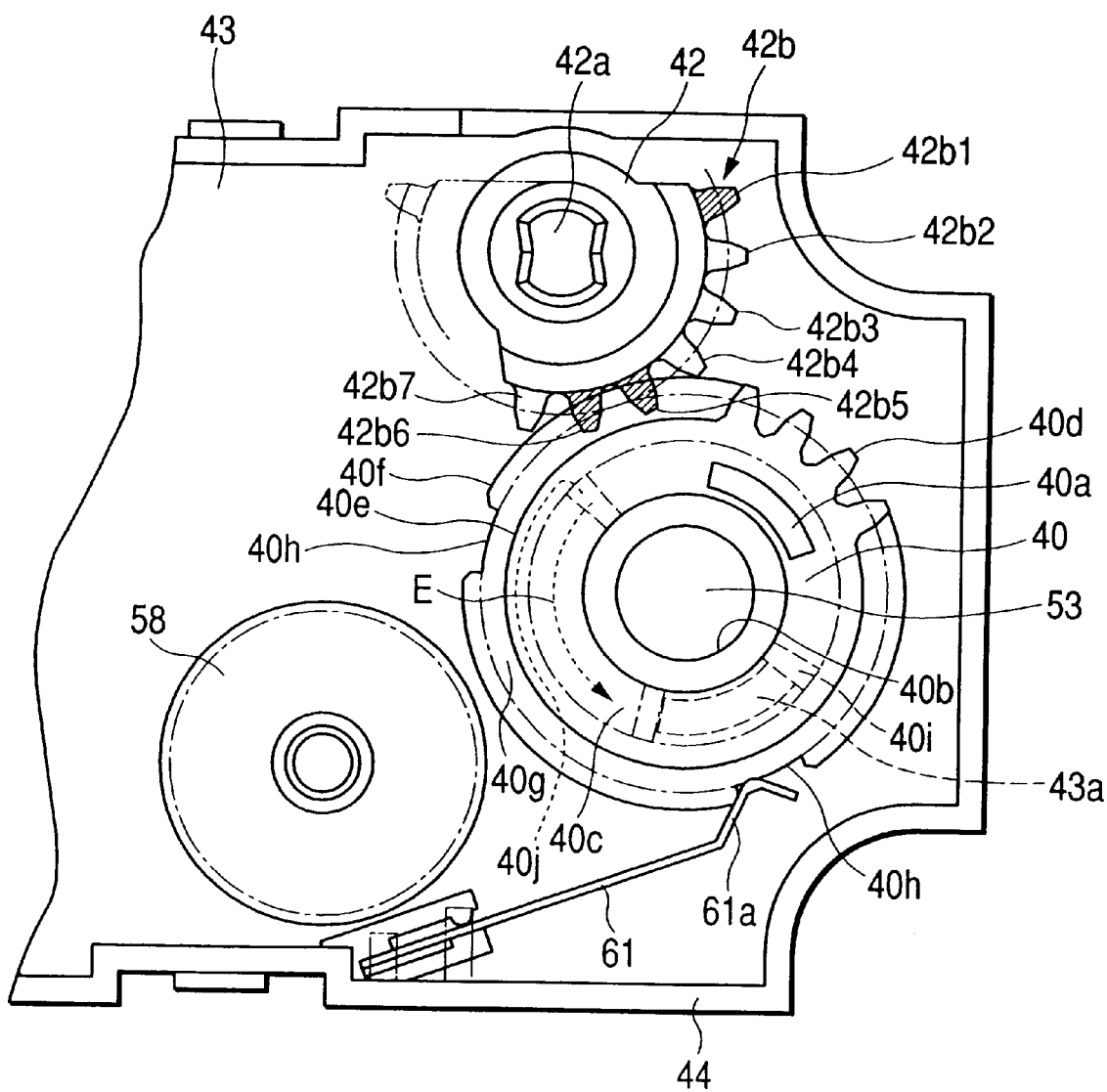
FIG. 10 is an explanatory view of the main portions of the internal structure of the drive part shown in FIG. 7, with a portion thereof omitted.
Figure 11A:
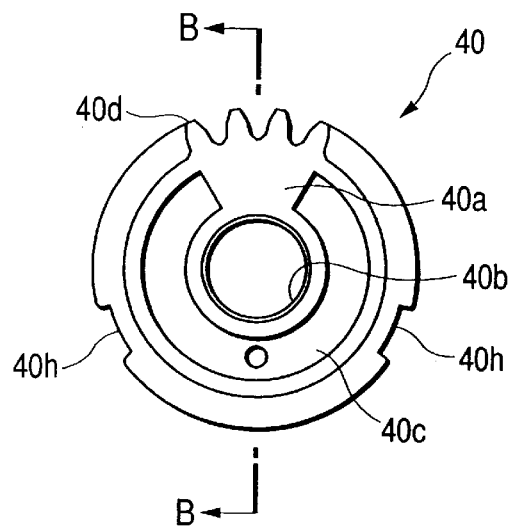
FIG. 11(A) is a front view thereof.
Figure 11B:
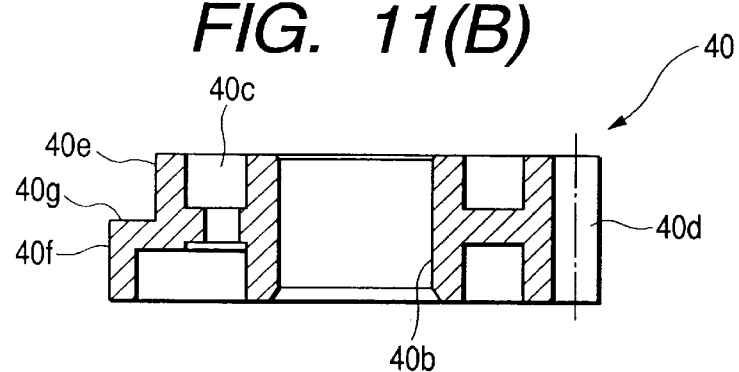
FIG. 11(B) is a section view thereof taken along the arrow line B—B shown in FIG. 11(A)

On the other hand, the second drive gear 40, as shown in FIGS. 8 and 10, is rotatably supported on the case body 36 because a fitting hole 40*b* formed therein is fitted with the outside of the fixed shaft 53, and the second drive gear 40 is also disposed on the lower side of the first drive gear 39, that is, on the bottom surface portion 43 side of the case body 36. On the surface of the second drive gear 40 on the facing side to the first drive gear 39, that is, on the upper surface of the second gear 40, as shown in FIGS. 11(A) and (B), there are formed an arc-shaped rotation play groove 40*c* through the interior portion of which the engaging projecting piece 39*h* of the first drive gear 39 can be moved freely, and an engaging projecting piece 40*a* which can be engaged with the engaging projecting piece 39*h*. The engaging projecting piece 40*a* is formed in such a manner as to fill up a portion of the rotation play groove 40*c* and is also formed in an arc shape which has a predetermined length of width in the peripheral direction of the second drive gear 40 in the intermediate portion thereof existing between the rotation center of the second drive gear 40 and the outer peripheral end thereof. That is, the engaging projecting piece 40*a* is formed on the rotation locus of the engaging projecting piece 39*h* and in the same shape as the engaging projecting piece 39*h*.

Due to the above-mentioned structure, if a drive force is transmitted to the first drive gear 39 and the first drive gear 39 is thereby rotated in either of the forward or reverse direction, then the first drive gear 39 can be rotated with rotation play with respect to the second drive gear 40 and, only in a predetermined area, the engaging projecting piece 40*a* is engaged with the engaging projecting piece 39*h* of the first drive gear 39 so that the second drive gear 40 can be rotated integrally with the first drive gear 39.

Also, in a portion of the outer periphery of the second drive gear 40, there is formed a feed teeth portion 40*d* which is used to feed the second driven gear 42. The feed teeth portion 40*d* is used to transmit the rotation of the second drive gear 40 to the second driven gear 42 when the second drive gear 40 rotates integrally with the first drive gear 39. Therefore, the second driven gear 42 is able to follow the rotation of the first drive gear 39 indirectly in a different area from the first driven gear 41. Also, the remaining portion of the outer periphery of the second drive gear 40 is composed of a small diameter portion 40*e* which is formed in such a manner as to have a diameter equal to the diameter of the root portion of the feed teeth portion 40*d*, a large diameter portion 40*f* formed in such a manner as to have a diameter equal to the diameter of the crest portion of the feed teeth portion 40*d*, and a stepped portion 40*g* formed in such a manner as to continue with both of the small diameter portion 40*e* and large diameter portion 40*g*.

And, in the large diameter portion f, there are formed groove portions 40*h* and 40*h* which are respectively used to position and hold the second drive gear 40. The groove portions 40*h* and 40*h* are structured such that, as shown in FIG. 10, an engaging piece 61*a* formed in the other end of a plate spring 61 having one end supported by the case body 36 can be fitted into the groove portions 40*h* and 40*h*. The plate spring 61 is normally energized on the second drive gear 40 side to prevent the second drive gear 40 from rotating together with the first drive gear 39 when the second drive gear 40 is not engaged with the first drive gear 39, that is, when the first drive gear 39 is rotating with rotation play.

Figure 11C:
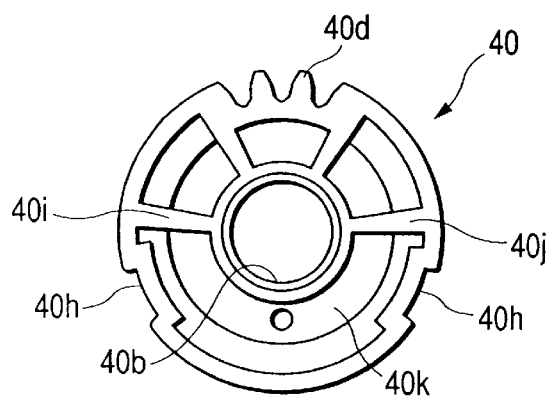
FIG. 11(C) is a view thereof when FIG. 11(*a*) is viewed from behind.

By the way, on the surface of the second drive gear 40 on the facing side thereof to the bottom surface portion 43 side of the case body 36, that is, on the lower side surface of the second drive gear 40, as shown in FIG. 11(C), there are formed rotation restricting butting portions 40*i*, 40*j* and a rotation guiding groove 40*k*. The rotation guiding groove 40*k* is formed of a groove obtained by cutting away a portion equivalent to 180° from the rotation locus of the intermediate portion of the second drive gear 40 between the rotation center of the second drive gear 40 and the outer periphery thereof, whereas the rotation restricting butting portions 40*i*, 40*j* are respectively formed of rib-shaped members respectively provided on the two ends of the rotation guiding groove 40*k*.

On the other hand, on the portion of the bottom surface portion 43 of the case body 36 on the facing portion thereof to the second drive gear 40, there is formed a rotation restricting portion 43*a* which is formed of a projection-shaped member projected into the rotation guiding groove 40*k* and having an arc shape of an angle of 60°. That is, the second drive gear 40 is to be rotated integrally with the first drive gear 39 with the rotation restricting portion 43*a* projected into the rotation guiding groove 40*k*. Therefore, the second drive gear 40 is rotatable in the range where the rotation restricting portion 43*a* is not butted against the rotation restricting butting portion 40*i* or the rotation restricting butting portion 40*j*, that is, in the range of 120°.

By the way, if the first drive gear 39 is rotated clockwise in FIG. 10, then the second drive gear 40 is allowed to rotate together with the first drive gear 39 at and from a predetermined position and, if the rotation restricting butting portion 40*j* is butted against the rotation restricting portion 43*a*, then the rotation of the first drive gear 39 is locked. In the second embodiment, by use of this mechanism, the rotation position of the first drive gear 39 is initialized. That is, the position, at which the first drive gear 39 can be rotated to the full in the closing direction while it rotates together with the second drive gear 40, is set as the original position of the first drive gear 39.

On the other hand, if the first drive gear 39 is rotated counterclockwise in FIG. 10, then the second drive gear 40 is allowed to rotate together with the first drive gear 39 at and from a predetermined position and, if the rotation restricting butting portion 40*i* is butted against the rotation restricting portion 43*a*, then the rotation of the first drive gear 39 is locked at the opposite position to the original position. In the second embodiment, by use of this mechanism, the rotation position of the first drive gear 39 may be initialized. That is, this position may be set as the original position of the first drive gear 39. This will be discussed later in detail.

Also, the first driven gear 41, as shown in FIGS. 7, 8 and 12, can be rotated following the rotation of the first drive gear 39 in a predetermined area and serves as a driven member which is used to transmit the rotation of the stepping motor 37 to one baffle 35*a*. That is, the first driven gear 41 is formed of a fan-shaped gear and, in the rotation center portion of the first driven gear 41, there is formed an engaging hole 41*a* serving as an engaging portion with respect to the drive shaft 62 of one baffle 35*a*. The engaging hole 41*a* has a shape obtained by projecting inwardly a portion of the inner wall of a circular-shaped hole to thereby narrow the present portion. That is, the engaging hole 41*a* has a shape composed of two fan shapes which are disposed symmetrically.

On the other hand, the portion of the first driven gear 41 to be engaged with the drive shaft 62 of the baffle 35*a* has a substantially rectangular-shape section; and, the short side portion of the present engaging portion is formed as a slightly arc-shaped portion so that it can extend along the arc-shaped portion of the engaging hole 41*a*. And, the smallest diameter portion of the engaging hole 41*a* of the first driven gear 41 is formed substantially equal to the diameter of the short side of the drive shaft 62. Due to this, when the first driven gear 41 rotates, it is allowed to rotate with play with respect to the drive shaft 62. For example, at first, the first driven gear 41 rotates with play with respect to the drive shaft 62 so that the rotation of the first driven gear 41 can be transmitted to the drive gear 62 in a slightly delayed manner. By the way, the angle of the play rotation of the first driven gear 41 is set as 10° on either side thereof.

Also, in the arc-shaped outer peripheral portion of the first driven gear 41, there is formed a teeth portion 41*b* which can be engaged with the feed teeth portion 39*d* of the first drive gear 39. The teeth portion 41*b* is composed of seven teeth 41*b*1–41*b*7. In the teeth portion 41*b*, in FIG. 7, the tooth 41*b*1 disposed first from top, the tooth 41*b*5 disposed fifth from top, and the tooth 41*b*6 disposed sixth from top are respectively formed in such a manner that their respective lower half sections in the axial direction thereof, that is, the half sections thereof on the bottom surface portion 43 side of the case body 36 are cut away.

Figure 12A:
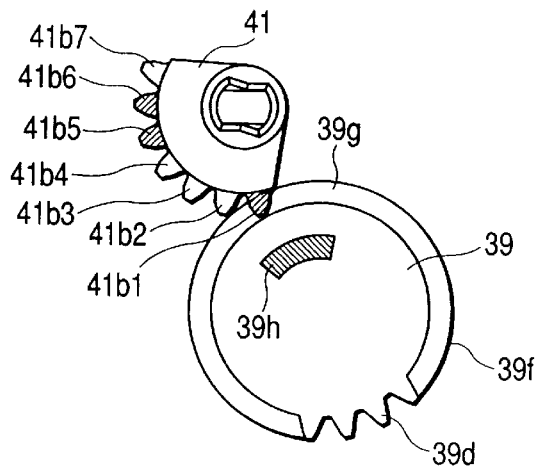
FIG. 12(A) shows an example of the relation in which both of them are held at their respective full opened positions.

Thanks to this structure, when the first driven gear 41 is engaged with the feed teeth portion 39*d* of the first drive gear 39, the rotation of the first drive gear 39 is transmitted to the first driven gear 41 and thus the first driven gear 41 can be rotated following the first drive gear 39. Also, in the other area, for example, when the baffle 35*a* is held at the full opened position, as shown in FIG. 12(A), the upper half section of the partially cutaway tooth 41*b*1 moves up onto the top of the stepped portion 39*bg* of the first drive gear 39. Also, when the baffle 35*a* is held at the full closed position, as shown in FIG. 12(B), the upper half sections of the teeth 41*b*5 and 41*b*6 respectively move up onto the top of the stepped portion 39*bg* of the first drive gear 39.

Figure 12B:
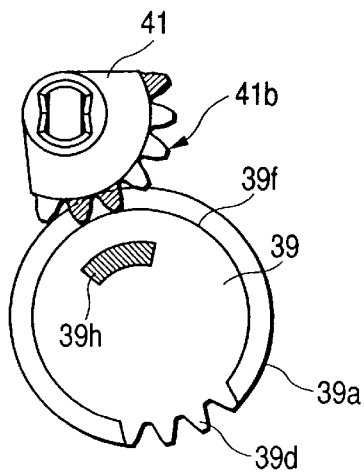
FIG. 12(B) shows an example of the relation in which both of them are held at their respective full closed positions.
Figure 13A:
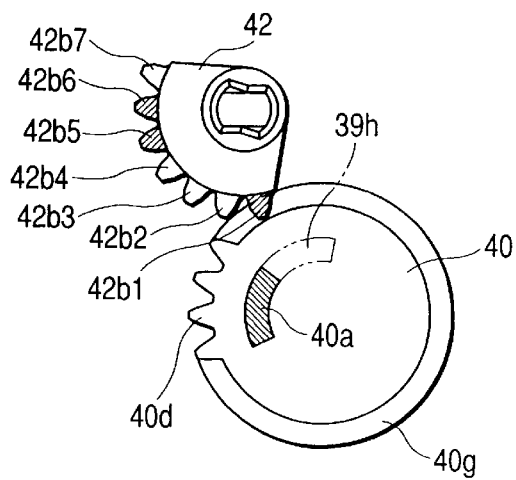
FIG. 13(A) shows an example of the relation in which both of them are held at their respective full opened positions.
Figure 13B:
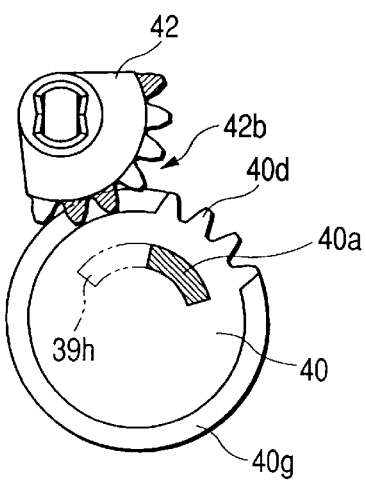
FIG. 13(B) shows an example of the relation in which both of them are held at their respective full closed positions.

In such move-up states, in FIG. 12(A), the tooth 41*b*2 and, in FIG. 12(B), the teeth 41*b*4 and 41*b*7 are in contact with the large diameter portion 39*f* of the first drive gear 39 to thereby prevent the first driven gear 41 against rotation.

The drive shaft 62 of the baffle 35*a* to be engaged with the first driven gear 41, as will be discussed later, is forcibly energized by an energizing spring 64 in a direction where the baffle 35*a* is closed (see FIG. 14). Due to this, when the baffle 35*a* is held at the full opened position, the first driven gear 41 is positioned and held with respect to the first drive gear 39 in such a manner that not only the upper half section of the tooth 41*b*1 moves up onto the stepped portion 39*g* of the first drive gear 39 but also the tooth 41*b*2 is pressed against the large diameter portion 39*f* of the first drive gear 39. On the other hand, when the baffle 35*a* is held at the full closed position, the first driven gear 41 is positioned and held with respect to the first drive gear 39 in such a manner that not only the respective upper half sections of the partially cutaway teeth 41*b*5 and 41*b*6 move up onto the stepped portion 39*g* of the first drive gear 39 but also the teeth 41*b*4 and 41*b*7 are in contact with the large diameter portion 39*f* of the first drive gear 39 with some play. In these two cases, the first drive gear 39 idles. By the way, the rotation range of the first driven gear 41 is set for 100°.

Also, the second driven gear 42, as shown in FIG. 8, rotates following the rotation of the second drive gear 40 in a predetermined area to thereby transmit the rotation of the second drive gear 40 to the drive shaft 63 of the other baffle 35*b*. And, the second driven gear 42 is similar in structure to the first driven gear 41 and operates similarly to the first driven gear 41. Thus, the detailed description of the structure and operation of the second drive gear 42 is omitted here.

On the other hand, the structure of the stepping motor 37 serving as a drive source is shown in FIG. 8. In particular, the rotor 60 is energized in one direction by a spring 65 and is thereby prevented against vibration. By the way, the rotor 60 includes a magnet 66 in addition to the above-mentioned pinion 60*a*; and, a stator is disposed in such a manner that it faces the magnet 66 and encloses the rotor 60, while the stator includes a magnet wire 67, a bobbin 69 with a projecting pin 68 disposed thereon, two cores 70 and 70, and two stator cases 71 and 71.

And, there are disposed a side plate 72 and a mounting plate 73 in such a manner that they enclose the stator cases 71 and 71.

In addition, a substrate 74 is mounted on a bracket 75 and the projecting pin 68 is connected to a print circuit provided on the surface of the substrate 74. On the other hand, to the substrate 74, there is connected a lead wire 76*a* through which the substrate 74 is connected to a microcomputer 76 for controlling and driving the stepping motor 37. The lead wire 76*a* is taken out from a notch 77 which is formed in the side wall portion 44 of the case body 36.

The two frames 33 and 33, as shown in FIGS. 5, 6, 8 and 14, are respectively formed in a quadratic prism having a small thickness. And, in the respective interior portions of the two frames 33 and 33, there are formed the opening parts 34, while the drive shafts 62 and 63 of the baffles 35*a* and 35*b* are stored in the two opening parts 34 respectively. On the two sides of the respective frame 33, there are formed the side walls 33*a* and 33*a* respectively for supporting the drive shafts 62 and 63 and, the portions of the respective frames 33 that support the drive shafts 62 and 63 on the first driven gear 41 and second driven gear 42 sides thereof are formed as through holes 33c and 33c. On the other hand, the other end sides of the drive shafts 62 and 63 are respectively fitted into bottomed holes 33d formed in the side walls 33a and are rotatably supported in the bottomed holes 33d.

By the way, on the centrally located side wall 33a of one frame 33, there are projectingly provided the four fixing shafts 33b which are used to fix the two frames 33 together with the drive part 32 between them. In the respective leading end portions of the four fixing shafts 33b, there are formed receive holes 33c respectively. And, the fixing shafts 33b, while the drive part 32 is held by and between the two frames 33, are respectively in contact with the side wall 33a of the other frame 33 in such a manner that they can be matched to insertion holes 33f respectively formed in the centrally located side wall 33a of the other frame 33. Further, screws 78 are respectively inserted through the insertion holes 33f and receive holes 33c so that the two frames 33 and 33 are fixed together.

On the other hand, referring to formation of each opening part 34, two opening forming portions 34a respectively projecting in parallel to their associated frame 33 enclose the periphery of an opening 34b to thereby be able to form the opening part 34. And, the portions of the opening forming portions 34a that face the opening 34b respectively provide projecting portions 34c which can be contacted with the baffles 35a and 35b respectively, that is, the projecting portions 34c respectively form the contact surfaces of the opening part 34 with respect to the baffles 35a and 35b.

Figure 14:
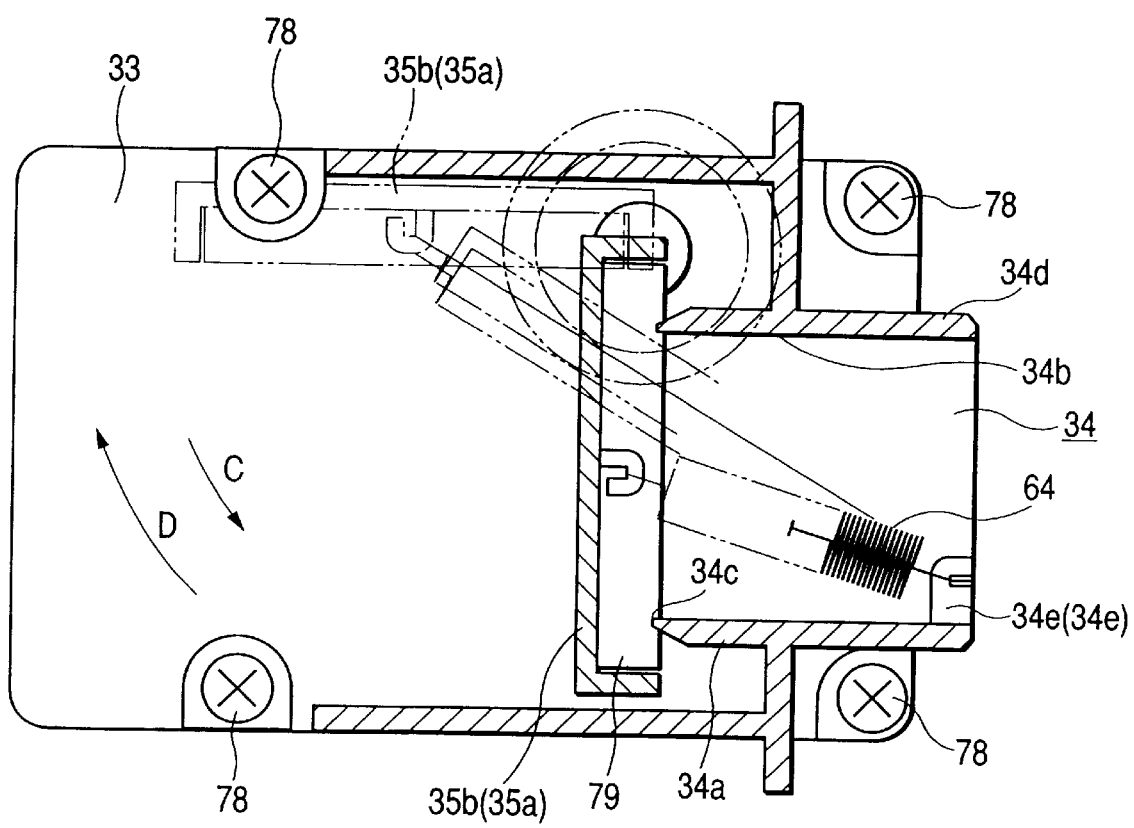
FIG. 14 is a section view taken along the line XIV—XIV shown in FIG. 6.
Figure 15:
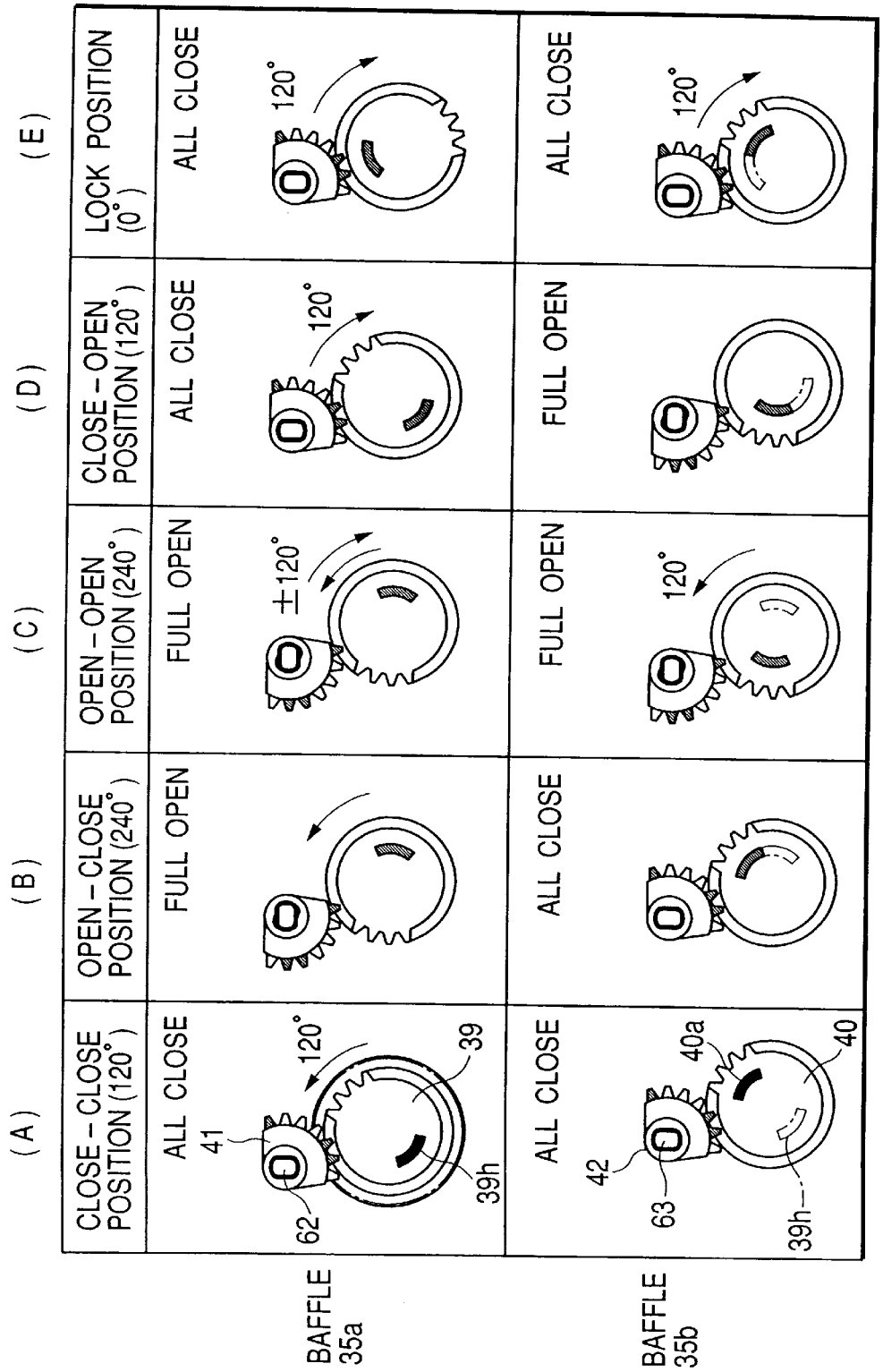
FIG. 15 is a table in which the relation between the first drive gear and first driven gear as well as the relation between the second drive gear and a second driven gear respectively employed in the double damper device shown in FIG. 5 are shown according to the rotation angles of the first drive gear.

Also, in the portions of the opening forming portions 34a that project on the opposite side to the projecting portions 34c, that is, in the projecting portions 34d of the opening forming portions 34a on the opposite side to the portions of the opening forming portions 34a with which the baffles 35a and 35b can be contacted, as shown in FIG. 14, there are formed securing portions 34e and 34e each for securing one end of each of energizing springs 64 and 64 which are used to energize forcibly the baffles 35a and 35b in their closing directions. And, the respective one-end portions of the energizing springs 64 and 64 are secured to the securing portions 34e and 34e, whereas the other-end portions thereof are secured to the baffles 35a and 35b respectively. By the way, in the present embodiment, each opening part 34 is formed integrally with its associated frame 33. However, this is not limitative but the opening part 34 can also be formed as a separate member.

Due to the above-mentioned structure, the baffles 35a and 35b are forcibly energized in a direction of an arrow C shown in FIG. 14, that is, in the closing direction, with the drive shafts 62 and 63 as their centers of rotation. By the way, as described above, while the baffles 35a and 35b are closed, neither the drive shaft 62 nor the drive shaft 63 are engaged with the first and second driven gears 41 and 42, but both of them are free to play, so that the rotation of the stepping motor 37 is not transmitted to them.

For this reason, when the baffles 35a and 35b are closed perfectly, they are closed by the energizing forces of the energizing springs 64.

Two sheets of soft tape 79 serving as damper members respectively fixed to the opening part 34 side portions of the baffles 35a and 35b to thereby form part of the baffles 35a and 35b. Also, the baffles 35a and 35b can be swung with the drive shafts 62 and 63 as their respective fulcrums; that is, they can be closed in a direction of an arrow C shown in FIG. 14 or opened in a direction of an arrow D shown in FIG. 14.

By the way, the thus structured double damper device 31 is incorporated into a refrigerator of a mid-freezer type, such as the refrigerator 21 which is shown in FIG. 4 and has been previously described in the first embodiment.

Next, description will be predetermined below of the operation of the present double damper device 31. By the way, the relation between the opened/closed states of the baffles 35a, 35b and the rotation angles of the first drive gear 39 is as in a table and an operation explanatory view respectively shown in FIGS. 15 and 16.

At first, after the double damper device 31 is incorporated into the refrigerator 21, the initialization (the first initialization) of the double damper device 31 is executed in the following manner. That is, the stepping motor 37 is rotated reversely to thereby allow the first drive gear 39 to rotate the second drive gear 40. In response to this, as shown in FIG. 10, the rotation restricting butting portion 40i of the second drive gear 40 is butted against the rotation restricting portion 43a provided in the case body 36 and the second drive gear 40 is thereby locked, while the first drive gear 39 is also locked together with the second drive gear 40. By the way, in this case, there is output to the stepping motor 37 a drive signal having a number of steps which allows the first drive gear to rotate beyond one rotation (360°), which means that an extra drive signal is output to the stepping motor 37. In this manner, in the second embodiment, in a state where the first drive gear 39 is locked, by outputting an extra drive signal to the stepping motor 37, the original position (0°)) of the first drive gear 39 is detected. Also, the position of the first drive gear 39, which is obtained after the first drive gear 39 is rotated by 120°, that is, by an amount equivalent to 3830 steps from the original position (0°)), is set as the closed-closed position thereof.

At the present closed-closed position (120°), as shown in FIG. 15(A), there is obtained a closed-closed mode in which the two baffles 35a and 35b are both held at their respective closed positions. In the closed-closed mode, the engaging projecting piece 39h of the first drive gear 39 is in contact with the engaging projecting piece 40a of the second drive gear 40; and, at the same time, the first driven gear 41 is locked in such a manner that the teeth 41b4 and 41b7 thereof are in contact with the first drive gear 39, while the second driven gear 42 is locked in such a manner that the teeth 42b4 and 42b7 thereof are in contact with the second drive gear 40.

The microcomputer 76, which controls the temperature of the interior portions of the refrigerator 21 through the operation of the refrigerator 21, gives the double damper device 31 an instruction to introduce the cool air into the compartments of the refrigerator 21 with which the baffles 35a and 35b are associated.

Figure 16:
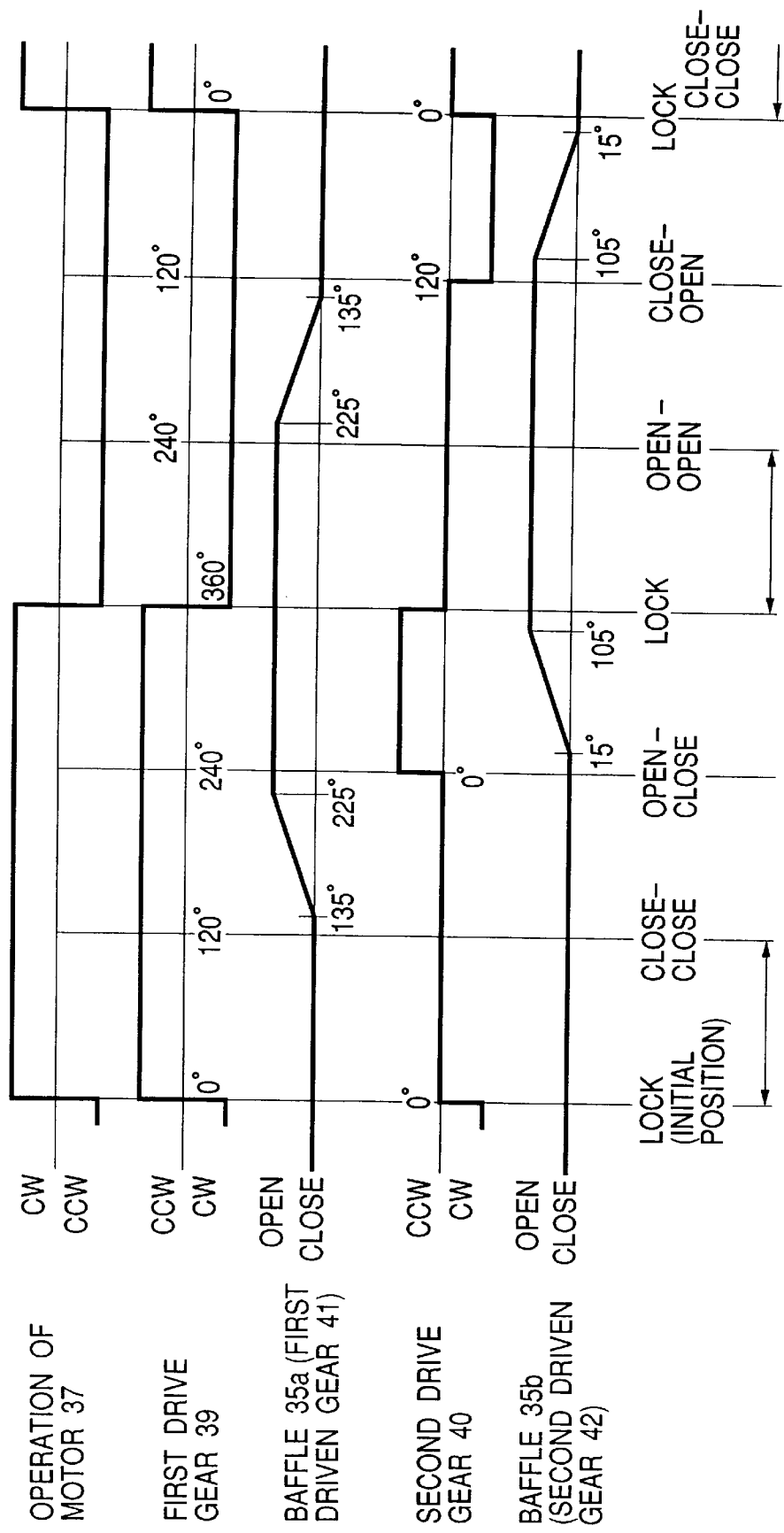
FIG. 16 is an explanatory view of the relations among the operation of a stepping motor, the rotational operation of the second drive gear, and the opening and closing operations of two baffles respectively employed in the double damper device shown in FIG. 5.
Figure 17:
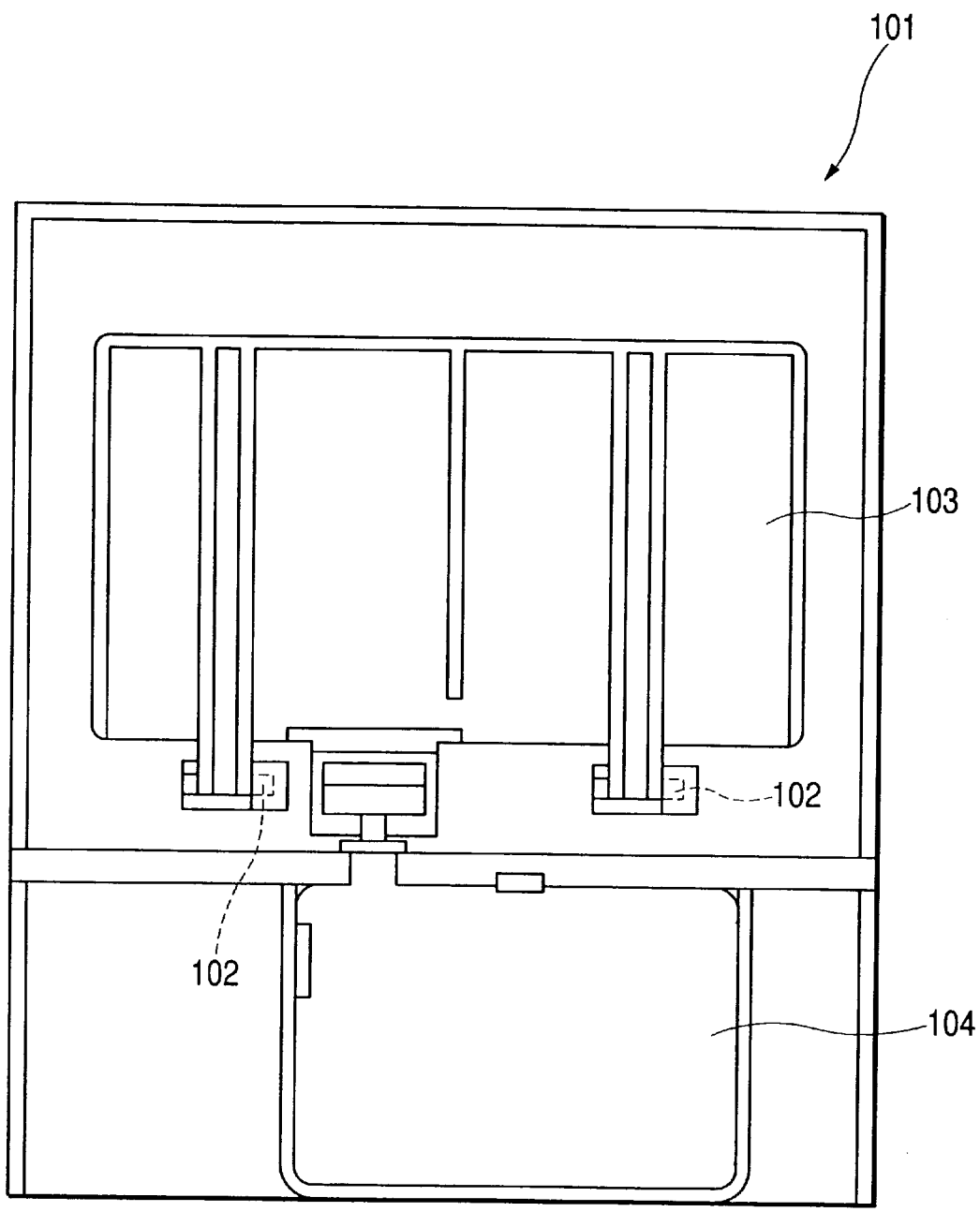
FIG. 17 is a back view of a conventional motor type damper device.
Figure 18:
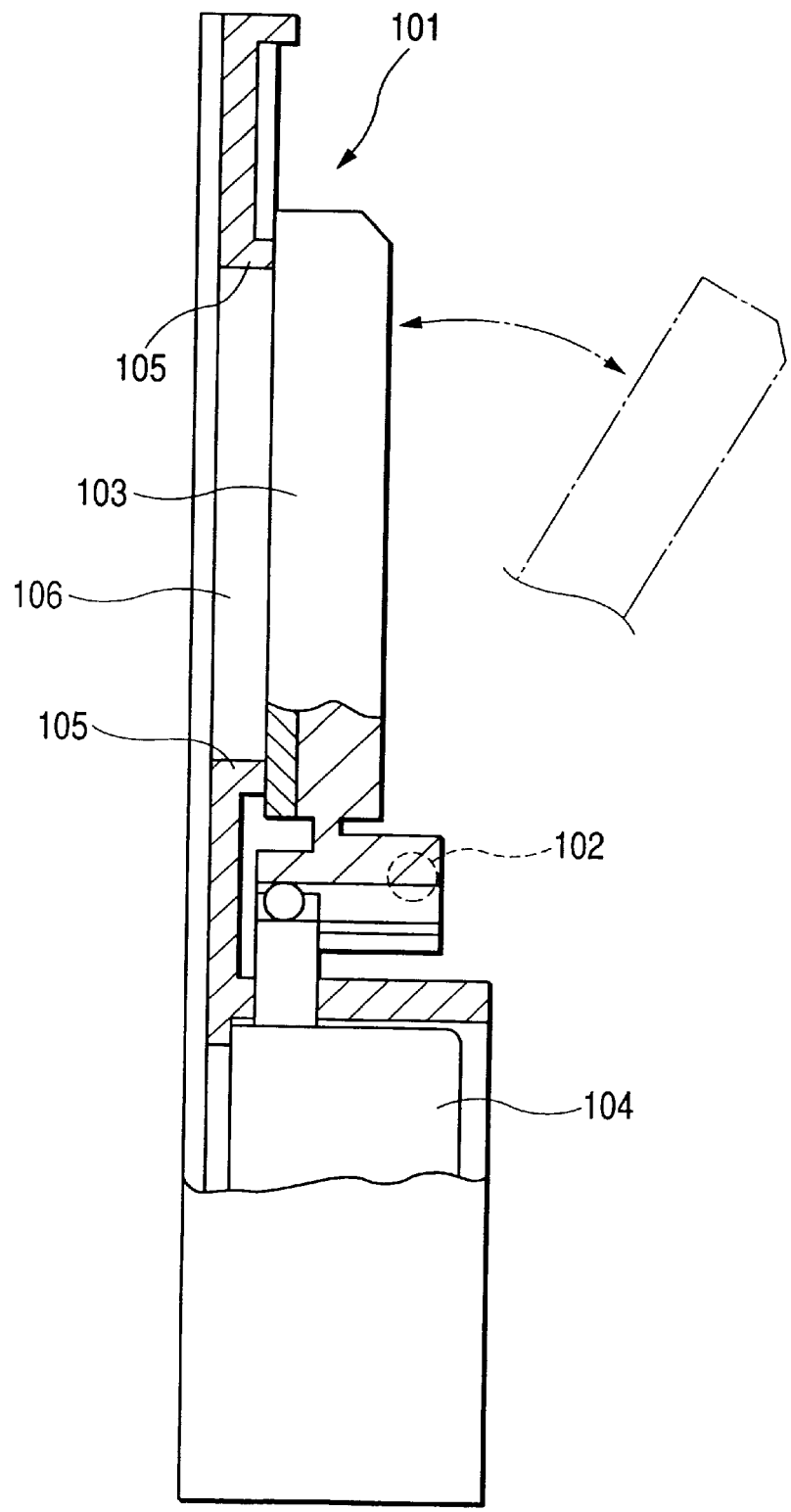
FIG. 18 is a partially sectional side view of the motor type damper device shown in FIG. 17.
Figure 19:
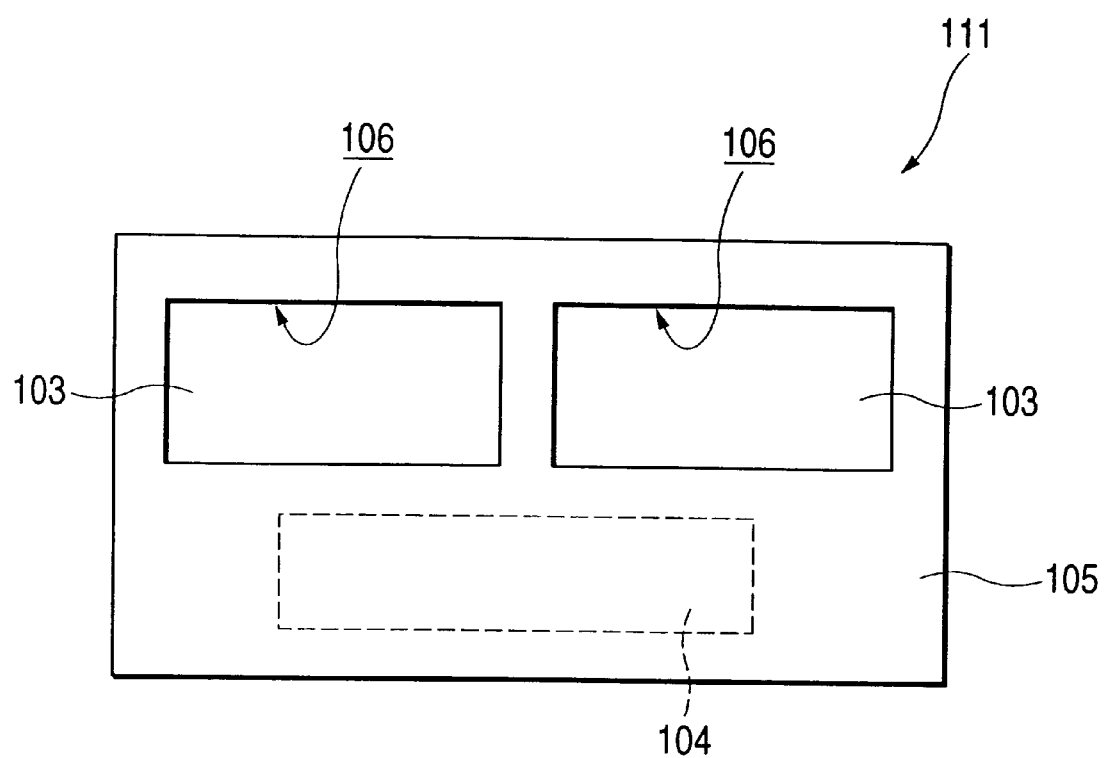
FIG. 19 is a back view of another conventional damper device which is a double damper device including two opening parts.

That is, the microcomputer 76 applies a predetermined number of pulses to the stepping motor 37 to thereby energize the stepping motor 37 electrically. In response to this, the rotor 60 of the stepping motor 37 is driven in the forward direction by a predetermined amount, and the rotation of the rotor 60 is transmitted to the first drive gear 39 through the pinion 60a, first reduction gear 55, second reduction gear 56, third reduction gear 57 and fourth reduction gear 58. By the way, in the second embodiment, as shown in FIG. 16, the opened and closed states of the baffles 35a and 35b are respectively controlled by the rotation angles of the first drive gear 39.

That is, if the first drive gear 39 is rotated by 120° in the forward direction from the closed-closed position shown in FIG. 15(A) and is thereby moved to and held at a position shown in FIG. 15(B), then the feed teeth portion 39d of the first drive gear 39 is engaged with the teeth portion 41*b* of the first driven gear 41, so that the first driven gear 41 is thereby fed to a position shown in FIG. 15(B). By the way, in this case, the engaging projecting piece 39*h* of the first drive gear 39 is rotated in a direction where it is moved apart from the engaging projecting piece 40*a* of the second drive gear 40. In other words, the first drive gear 39 is rotated with play with respect to the second drive gear 40, so that the second drive gear 40 is not rotated. In particular, the first drive gear 39 is allowed to rotate until the engaging projecting piece 39*h* thereof is rotated through the groove portion 40*h* of the second drive gear 40 and is butted against the opposite side of the engaging projecting piece 40*a* of the second drive gear 40. Therefore, the second drive gear 42 is not operated during this period of time.

By the way, as described above, because the engaging hole 41*a* of the first driven gear 41 has play having an angle of 10° on both sides thereof with respect to the drive shaft 62, when the first driven gear 41 starts to rotate, the baffle 35*a* starts to rotate in a slightly delayed manner. And, the baffle 35*a*, together with the first driven gear 41, is rotated by 90° in the opening direction and is thereby held at the full opened position. Also, the first driven gear 41 is rotated by a total angle of 100° which includes the angle of 10° in the initial play and the angle of 90° in the present rotation.

Also, if the baffle 35*a* is held at the full opened position, then the energizing spring 64 is stretched to thereby energize the baffle 35 in the closing direction. In this case, the tooth 41*b*2 of the first driven gear 41 is pressed against the large diameter portion 39*f* of the first drive gear 39 by the energizing force of the energizing spring 64 and, in this state, the opened state of the baffle 35*a* is held. Thus, if the first drive gear 39 is rotated from the closed-closed position shown in FIG. 15(A) and is thereby moved to and held at the position shown in FIG. 15(B), that is, the position of 240°, then the baffle 35*a* takes the full opened position, whereas the baffle 35*b* remains held at the full closed position because the second drive gear 40 is not rotated. Therefore, when the first drive gear 39 is held at the position of 240°, there is obtained an opened-closed mode in which the baffle 35*a* is held at the full opened position and the baffle 35*b* is held at the full closed position.

Also, if the first drive gear 39 is rotated further by 120° from the position (240°) shown in FIG. 15(B) to a lock position and is thereafter rotated reversely, then the two baffles 35*a* and 35*b* are both rotated to and held at their respective opened-opened positions shown FIG. 15(C). That is, if the first drive gear 39 is rotated from the position of 240° to a lock position of 360°, then the engaging projecting piece 39*h* of the first drive gear 39 is firstly engaged with the engaging projecting piece 40*a* of the second drive gear 40, so that the second drive gear 40 is rotated following the rotation of the first drive gear 39. In this case, since the first drive gear 39 is not in such rotation position that the feed teeth portion 39*d* thereof is engaged with the first driven gear 41, the first driven gear 41 is not rotated. Therefore, the baffle 35*a* remains held at the above-mentioned fully opened position. On the other hand, since the second drive gear 40 rotates while the feed teeth portion 40*d* thereof is in engagement with the teeth portion 42*b* of the second driven gear 42, the baffle 35*b* is moved from the full closed position to the full opened position. the way, the engaging hole 42*a* of the second driven gear 42 is engaged with the drive shaft 63 of the baffle 35*b* when the second driven gear 42 is rotated by an angle of 10° or so. And, the baffle 35*b*, together with the second driven gear 42, is rotated by an angle of 90° in the opening direction and is thereby moved to and held at the full opened position. Here, the second driven gear 42 is rotated by a total angle of approx. 100° which includes the angle of 10° in the initial rotation before the above engagement and the angle of 90° in the rotation after the above engagement.

Also, if the baffle 35*b* is held at the full opened position, then the energizing spring 64 is stretched to thereby energize the baffle 35*b* in the closing direction. In this case, the tooth 42*b*2 of the first driven gear 42 is pressed against the large diameter portion 40*f* of the second drive gear 40 by the energizing force of the energizing spring 64 and, in this state, the opened state of the baffle 35*b* is held. Thus, if the first drive gear 39 is rotated from the original position shown in FIG. 15(A) and is thereby moved to and held at the position of 360°, then the baffles 35*a* and 35*b* both take the their respective full opened positions.

After then, if the first drive gear 39 is rotated reversely from the lock position to the position of 240°, then the first drive gear 39 is not held at a rotation position where the feed teeth portion 39*d* thereof is engaged with the first driven gear 41, so that the first driven gear 41 is not rotated and thus the baffle 35*a* remains held at the full opened position. At the then time, the engaging projecting piece 39*h* of the first drive gear 39 is rotated in a direction where it is moved apart from the engaging projecting piece 40*a* of the second drive gear 40. In other words, the first drive gear 39 is rotated with play with respect to the second drive gear 40, so that the second drive gear 40 is not rotated.

That is, during the above operation, the first drive gear 39 is rotated reversely in such a manner that the engaging projecting piece 39*h* thereof plays in the groove portion 40*h* of the second drive gear 40. Therefore, the baffle 35*b*, similarly to the baffle 35*a*, remains held at the full opened position. As a result of this, as shown in FIG. 15(C), at the position of 240°, the two baffles 35*a* and 35*b* are held in the closed-closed mode.

By the way, if the first drive gear 39 is rotated from the position (240°) shown in FIG. 15C to the lock position (360°), then the second drive gear 40 is also rotated following the first drive gear 39 so that, as shown by a dotted arrow line E in FIG. 10, the rotation restricting butting portion 40*j* of the second drive gear 40 is moved and butted against the rotation restricting portion 43*a* formed in the case body 36. At the then time, in the second embodiment, the stepping motor 37 is not overstepped but is rotated reversely at once. By the way, as described before, of course, the rotation position of 360° may also be set as the original position.

Further, if the first drive gear 39 is rotated in the opposite direction further 120° from the position (240°) shown in FIG. 15(C) to a position (120°) shown in FIG. 15(D), then the feed teeth portion 39*d* of the first drive gear 39 is engaged with the teeth portion 41*b* of the first driven gear 41 so that the first driven gear 41 is fed to a position shown in FIG. 15(D). At the then time, since the engaging projecting piece 39*h* of the first drive gear 39 is rotated in a direction where it is moved apart from the engaging projecting piece 40*a* of the second drive gear 40, the first drive gear 39 is rotated with play with respect to the second drive gear 40, so that the second drive gear 40 is not rotated. That is, during the above operation, the first drive gear 39 is rotated reversely until the engaging projecting piece 39*h* thereof is moved through the groove portion 40*h* of the second drive gear 40 and is thereby butted against the opposite side of the engaging projecting piece 40*a* of the second drive gear 40.

In this case, the baffle 35*a*, together with the first driven gear 41, is rotated by 90° in the closing direction and is butted against the projecting portion 34*c* of the opening part 34 os that it is held at the full closed position. By the way, the first driven gear 41 is rotated by 10° further from the position where the baffle 35a is butted against the projecting portion 34c. Thanks to the extra 10° rotation, even if the baffle 35a is slightly different in precision from the projecting portion 34c, the action of the soft tape 79 can be used, which allows the baffle 35a to close the opening part 34 forwardly.

Also, if the baffle 35a is held at the full closed position, then the energizing spring 64 is compressed and the energizing force of the energizing spring 64 is thereby reduced. Owing to this, the teeth 41b4 and 41b7 of the first driven gear 41 are in contact with the large diameter portion 39f of the first drive gear 39 with slight play and, in this loose contact state, the baffle 35a is held at the full closed position. In this manner, if the first drive gear 39 is rotated from the position (240°) shown in FIG. 15(C) to the position shown in FIG. 15(D), that is, the position of 120°, then the baffle 35a is moved to and held at the full closed position, whereas the baffle 35b remains held at the full opened position because it is not rotated. After the first drive gear 39 is rotated by 360° in this manner, if the first drive gear 39 is rotated reversely and is thereby moved back to the position of 120°, there is obtained the closed-opened mode in which the baffle 35a is held at the full closed position and the baffle 35b is held at the full opened position.

Further, if the first drive gear 39 is rotated further by 120° from the position of 120° shown in FIG. 15(D) and is thereby returned back to a state shown in FIG. 15(E), that is, the lock position or the original position, then the engaging projecting piece 39h of the first drive gear 39 is engaged with the engaging projecting piece 40a of the second drive gear 40, so that the second drive gear 40 is rotated following the rotation of the first drive gear 39. In this state, since the first drive gear 39 is not in such rotation position that the feed teeth portion 39d thereof is engaged with the first driven gear 41, the first driven gear 41 is not rotated. Therefore, the baffle 35a remains held at the above-mentioned full closed position. On the other hand, the feed teeth portion 40d of the second drive gear 40 is engaged with the teeth portion 42b of the second driven gear 42, so that the second driven gear 42 is fed to the position shown in FIG. 15(F).

By the way, if the first drive gear 39 is rotated from the position (120°)) shown in FIG. 15(D) to the original position shown in FIG. 15(E), then the second drive gear 40 is also rotated following the first drive gear 39 and, as shown in FIG. 10, the rotation restricting butting portion 40i of the second drive gear 40 is butted against the rotation restricting portion 43a formed in the case body 36. When moving the second drive gear 40 to the lock position in this manner, if this moving operation is the first initialization, then the stepping motor 37 is overstepped slightly (in the second embodiment, an amount equivalent to 100 steps) to thereby output an extra drive signal, whereby the rotation of the first drive gear 39 is locked mechanically and the original position of the first drive gear 39 is detected. By the way, in the initialization that is executed in a normal operation, the overstepping of the stepping motor 37 is not executed.

By the way, the baffle 35b, together with the second driven gear 42, is rotated by 90° in the closing direction and is butted against the projecting portion 34c of the opening part 34, so that the baffle 35b is held at the full closed position. In this case, the second driven gear 42 is rotated by 10° further from the position where the baffle 35b is butted against the projecting portion 34c and thus, similarly to the first driven gear 41, the second driven gear 42 is rotated a total of 100°. The action of this extra rotation is similar to the baffle 35a.

Also, if the baffle 35b is held at the full closed position, then the energizing spring 64 is compressed and the energizing force of the energizing spring 64 is thereby reduced. At the then time, the teeth 42b4 and 42b7 of the second driven gear 42 are in contact with the large diameter portion 40f of the second drive gear 40 with slight play and, in this loose contact state, the baffle 35b is held at the full closed position. In this manner, if the first drive gear 39 is rotated from the position (120°) shown in FIG. 15(D) to the position shown in FIG. 15(E), that is, the original position (0°), then the baffle 35a maintains the full closed position, whereas the baffle 35b remains held at the full closed position. After then, if the first drive gear 39 is rotated by 120° in the forward direction, then there is obtained the closed-closed mode in which the baffle 35a and baffle 35b are both held at the full closed positions.

By the way, the movements of the baffles 35a and 35b between the above-mentioned four positions including the movements thereof from the opened-closed positions to the closed-opened positions, the movements thereof from the opened-closed positions to the other positions, and the like can be carried out freely by recognizing and controlling the rotation positions of the baffles 35a and 35b according to the number of steps and rotation direction of the stepping motor 37.

Here, not only the time necessary to move the baffles 35a and 35b from the full opened position to the full closed position but also the time necessary to move them in the opposite direction can be controlled according to the rate of generation of pulses.

Also, it is also possible to stop the baffles 35a and 35b not at the perfectly full opened position but at the intermediate position existing between the full opened position and full closed position. By the way, in the above-mentioned respective embodiments, the moving angle from the full opened position to the full closed position is set as 90°, but other angles can also be employed according to cases.

By the way, the above-mentioned description is based on the assumption that the temperature of the interior portion of the refrigerator 21 with the double damper device 31 incorporated therein does not vary in an abnormal manner but the double damper device 31 is operated in a normal manner. However, actually, if the temperature of the interior portion of the refrigerator 21 varies abnormally because the drive mechanism for driving the two baffles 35a and 35b of the double damper device 31 is frozen or for some other reason, then the microcomputer 76 judges that something is wrong with the control of the rotation positions of the two baffles 35a and 35b of the double damper device 31 and thus initializes the double damper device 31 once, or, in some cases, initializes the double damper device 31 periodically, for example, once or several times a day. In these cases, there is used a method for driving an opening/closing member according to the invention.

Now, description will be predetermined below of, by way of an example, the control of the present driving method to be made when returning the opening/closing member from the opened-closed mode to the original position.

If the microcomputer 76 applies a predetermined number of pulses to the stepping motor 37 to thereby energize the stepping motor 37 electrically, then the first drive gear 39 is rotated up to an intermediate position, that is, the position of 240°, while the two baffles 35a and 35b are moved from the closed-closed positions shown in FIG. 15(A) to the opened-closed positions shown in FIG. 15(B). At the then time, the microcomputer 76 recognizes the rotation angle of the first drive gear 39 according to the number of steps of the stepping motor 37 to thereby assume the rotation positions of the baffles 35a and 35b. By the way, it is assumed that, to drive the first drive gear 39 from 0° to 360°, it is necessary to drive the stepping motor 37 with 11490 steps. From this assumption, if the stepping motor 37 is driven with 3830 steps, then the first drive gear 39 is driven from the closed-closed position of 120° to the opened-closed position of 240°.

When the microcomputer 76 judges that the double damper device 31 must be initialized for some reason or other, or when the microcomputer 76 initializes the double damper device 31 periodically, the microcomputer 76 controls and drives the double damper device 31 such that the first drive gear 39 is driven to 0°, that is, to the original position. In this case, at first, the microcomputer 76 applies a predetermined number of steps to the stepping motor 37 to thereby energize the stepping motor 37 electrically so that the first drive gear 39 can be rotated in the opposite direction to the original position and can be stopped at a position to which the first drive gear 39 can be moved to the full, that is, at the lock position of 360°. That is, the microcomputer 76 sends to the stepping motor 37 a control signal which allows the stepping motor 37 to rotate in the forward direction by an amount equivalent to 3830 steps. In this case, the microcomputer 76 recognizes that the first drive gear 39 is driven from the position of 240° to the position of 360° and thus assumes that the two baffles 35a and 35b are both held at their respective full opened positions.

Next, the microcomputer 76 applies a predetermined number of steps to the stepping motor 37 to thereby energize the stepping motor 37 electrically so that the first drive gear 39 can be rotated over the full angles from the position of 360° to the position of 0°, that is, the original position. In response to this, the stepping motor 37 is driven or rotated in the reverse direction by an amount equivalent to 11490 steps, namely, full steps. As a result of this, the first drive gear 39 is forwardly returned to the original position and, at the same time, the two baffles 35a and 35b are both driven from the full opened positions to the full closed positions. In this case, the mechanical locking of the drive mechanism can hardly occur. By the way, after the initialization is executed in this manner, the microcomputer 76 controls the stepping motor 37 such that the first drive gear 39 is rotated by 120° in the forward direction and the baffles 35a and 35b are moved to the opened-opened mode shown in FIG. 15(A).

By the way, when the first drive gear 39 is returned to the original position according to the above-mentioned method, even if the recognition of the microcomputer 76 is deviated from the actual rotation position of the first drive gear 39 for some reason or other, the first drive gear 39 can be forwardly returned to the original position or the closed-closed position by initializing the double damper device 31. Also, if the double damper device 31 is initialized from the state in which the rotation position of the first drive gear 39 is deviated from the position recognized by the microcomputer 76, then the first drive gear 39 is locked mechanically by an amount equivalent to the deviation from the position recognized by the microcomputer 76 at the 360° position or at the 0° position. However, when compared with a case in which the stepping motor 76 is suddenly driven by full steps toward the 0° direction to thereby initialize the double damper device 31, the above-mentioned method according to the second embodiment can reduce the time of the mechanical locking to a considerable extent.

Further, if the initialization is executed when the two baffles 35a and 35b are held at their respective normal positions, no mechanical locking can occur.

The above-me The above-mentioned drive method, in which the double damper device 31 is driven once in the opposite direction to the original position, can be applied not only to the above-mentioned initialization of the double damper device 31, but also to the normal operation of the double damper device 31 or to both of the initialization and normal operation thereof.

Also, in the motor type damper device 1 according to the previously described first embodiment, because the angle of the intermediate position M is decided in a single meaning manner by the number of steps, when driving the opening/closing member from the intermediate position M to the full closed position N, the opening/closing member is firstly driven in the opposite direction all the time. However, in the double damper device 31 according to the second embodiment, since the opened-closed position and closed-opened position are set using the intermittent drive mechanism, the rotation positions of the baffles 35a and 35b are scarcely deviated from the expected positions. Therefore, the present double damper device 31 may be initialized periodically, for example, once or several times a day, or may be initialized when special conditions occur, for example, when the degree of an increase in the temperature of the refrigerator is too low as compared with the theoretically assumed value. However, as in the first embodiment, it is also possible to execute the present drive method every time.

By the way, although the respective embodiments described hereinabove are the preferred embodiments of the invention, the invention is not limited to them but various changes and modifications are possible without departing from the subject matter of the present invention. For example, in the above-mentioned respective embodiments, the opening/closing member driving method according to the invention is employed in a damper device for use in a refrigerator. However, the opening/closing member driving method according to the invention can also be applied to other various mechanisms, provided that the mechanisms are used to open and close an opening/closing member and the opening/closing member must be returned to its original position.

Also, although the soft tape 17, 79 is used in the illustrated respective embodiments, the soft tape 17, 79 can also be omitted when the severe degree of airtightness is not required.

Further, although the reduction gear train is used in the second embodiment, it is not always necessary to use the reduction gear train. Still further, as the method for driving the stepping motor 6, 37, not only a bipolar driving method but also other various driving methods such as a unipolar driving method and the like can also be employed as the need arises; and, as the various specifications including the step angle, torque and the like, various values can be employed properly depending on the uses of the stepping motor 6, 37.

By the way, in the illustrated respective embodiments, the invention is applied to the damper device which is structured such that it includes a duct-shaped frame. However, the invention can also be applied to other damper devices having different structures.

Also, the present invention can also be applied to other various damper devices which are used to control the flow of the fluid in a ventilation duct and the like, besides a refrigerator.

Also, instead of the stepping motor 6, 37, other drive sources such as a DC motor, an AC synchronous motor and the like can also be used. In such case, to detect the rotation position of a transmission member, the rotation position of a rotary member is to be recognized by recognizing the motor driving time.

As has been described heretofore, according to an opening/closing member driving method of the present invention, after the transmission member is driven in the opposite direction to the original position, the motor is rotated reversely to thereby drive the transmission member toward the original position. This prevents the transmission member and opening/closing member from being locked mechanically at the original position for a long time, so that the opening/closing member can be returned forwardly to the original position. This can reduce noise and abnormal loads caused by the mechanical locking of the transmission member and opening/closing member, which leads to the improved quality and extended life of the damper device to be driven by the present drive method.

What is claimed is:

1. An opening/closing member driving method for driving and closing a single opening/closing member to open and close an opening part by a drive part, the drive part comprising a two-way rotatable motor serving as a drive source for driving the opening/closing member in an opening direction and in a closing direction and a transmission member for transmitting the rotation of the motor to the opening/closing member, said opening/closing member driving method comprising the steps of:

setting an original position defined by one of the conditions when said transmission member is moved to the full in one direction and when said transmission member is moved to the full in the opposite direction;

moving said transmission member such that it is stopped at an intermediate position; and driving said transmission member by a predetermined amount in the opposite direction to the direction of said original position when returning said transmission member from said intermediate position to said original position;

stopping said transmission member at a position where said transmission member is moved to one of the full in the opposite direction to said original position direction and in vicinity of said position;

reversely rotating said motor to drive said transmission member in said original position direction so as to return the same to said original position.

2. An opening/closing member driving method as set forth in claim 1, wherein a first position defined when said opening/closing member is driven to the full in said opening direction is set as a full opened position, a second position defined when said opening/closing member is driven to the full in said closing direction is set as a full closed position, a third position where said opening/closing member is mechanically locked at either of said full opened position or said full closed position corresponds to said original position, and said opening/closing member is stopped at an intermediate position between said full opened position and said full closed position by stopping said transmission member at said intermediate position.

3. An opening/closing member driving method as set forth in claim 2, wherein said original position is set at said full closed position.

4. An opening/closing member driving method as set forth in claim 1, further comprising:

position recognizing means for estimating the rotation position of said opening/closing member by recognizing the drive amount of said motor.

5. An opening/closing member driving method as set forth in claim 4, wherein said motor is a stepping motor, and further comprising:

stepping motor control means for driving said opening/closing member to a predetermined position by applying a predetermined number of pulses to said stepping motor, wherein said stepping motor control means includes said position recognizing means and said position recognizing means recognizes the number of pulses to be applied to said stepping motor to recognize the position of said opening/closing member.

6. An opening/closing member driving method as set forth in claim 4, further comprising the steps of:

when returning said transmission member to said original position after said transmission member is stopped at said intermediate position, driving said transmission member in the opposite direction to the direction of said original position by an amount equivalent to an angle amount from said intermediate position estimated by said position recognizing means; and driving said stepping motor in said original position direction at least by an amount equivalent to the whole angle from said opposite position of said original position to said original position.

7. An opening/closing member driving method as set forth in claim 1, wherein said opening/closing member includes two opening/closing members, said drive part includes two driven members which can be respectively rotated following the rotation of said transmission member in different areas to transmit the rotation of said motor to said two opening/closing members, said drive part includes an opened-opened mode in which both of said two opening/closing members are held at opened positions by reciprocating said transmission member once, a closed-closed mode in which both of said two opening/closing members are held at closed positions by reciprocating said transmission member once, an opened-closed mode in which one of said two opening/closing members is held at an opened position and the other is at a closed position by reciprocating said transmission member once, and, a closed-opened mode in which one of said two opening/closing members is held at a closed position and the other is at an opened position by reciprocating said transmission member once, said original position is set in one of said opened-opened mode and said closed-closed mode.

8. An opening/closing member driving method as set forth in claim 7, further comprising:

position recognizing means for estimating the rotation position of said opening/closing member by recognizing the drive amount of said motor.

9. An opening/closing member driving method as set forth in claim 7, wherein said motor is a stepping motor, and further comprising:

stepping motor control means for driving said opening/closing member to a predetermined position by applying a predetermined number of pulses to said stepping motor, wherein said stepping motor control means includes said position recognizing means and said position recognizing means recognizes the number of pulses to be applied to said stepping motor to recognize the position of said opening/closing member.

10. An opening/closing member driving method as set forth in claim 7, further comprising the steps of:

when returning said transmission member to said original position after said transmission member is stopped at said intermediate position, driving said transmission member in the opposite direction to the direction of said original position by an amount equivalent to an angle amount from said intermediate position estimated by said position recognizing means; and driving said stepping motor in said original position direction at least by an amount equivalent to the whole angle from said opposite position of said original position to said original position.

11. A double damper device comprising:

first and second opening/closing plates which open and close two respective opening portions;

a drive portion for driving said first and second opening/closing plates in an opening and a closing direction, said drive portion including:

a driving source;

a first drive driven by said driving source, and having a feed portion in a predetermined region thereof;

first transmitting means for transmitting a drive force generated by said driving source to one of said first and second opening/closing plates, said first transmitting means including a feed portion intermittently driven by engaging said first-drive feed portion, said first transmitting means further including an engagement portion engaged with a driving axis of one of said first and second opening/closing plates;

a second drive mounted on said first drive to follow the rotation of said first drive, said second drive having a feed portion in a predetermined region thereof; and second transmitting means for transmitting said driving force generated by said driving source to a driving axis of the other one of said first and second opening/closing plates, said second transmitting means including a feed portion intermittently driven by engaging said second-drive feed portion, said second transmitting means further including an engagement portion engaged with a driving axis of the other one of said first and second opening/closing plates.

12. The double damper device as claimed in claim 11, wherein said driving source rotates said first and second opening/closing plates in forward and reverse directions, an engagement timing of said second drive and said first transmitting means is shifted to an engagement timing of said second drive and said second transmitting means so that four modes are selectively switched during one return rotation of said first drive, wherein said four modes include:

a first mode wherein both said first and second opening/closing plates are in a closed state;

a second mode wherein said first opening/closing plate is in an open state and said second opening/closing plate is in a closed state;

a third mode wherein both said first and second opening/closing plates are in an open state; and a fourth mode wherein said first opening/closing plate is in a closed state and said second opening/closing plate is in an open state.

13. The double damper device as claimed in claim 11 wherein said first and second drives are intermittent gears, and said first and said second transmitting means are gears, and wherein said first and second drives are concentrically mounted so that an engagement portion is defined on a same rotation locus formed on a face confronted by each, and play is defined with respect to a mating engagement portion in a rotation direction.

14. The double damper device as claimed in claim 11, wherein said first and said second drives are accommodated in a case, said case includes rotation preventing means for applying a load to said second transmitting means to prevent said second transmitting means from being rotated with a rotation of said second drive.

15. The double damper device as claimed in claim 11, wherein a feed portion of said first transmitting means has position maintaining means for maintaining a position of said first transmitting means by contacting said first drive when said first-drive feed portion is engaged with said first transmitting means, and a feed portion of said second transmitting means has position maintaining means for maintaining a position of said second transmitting means by contacting said second drive.

16. The double damper device as claimed in claim 11, wherein said drive source is provided between said first and second closing/opening plates.

17. The double damper device as claimed in claim 12, wherein said driving source is a stepping motor.

18. The double damper device as claimed in claim 12, wherein said driving source is an AC motor.

19. The double damper device as claimed in claim 11, wherein said driving source is an AC motor.

20. A double damper device as claimed in claim 11, wherein each of said first and second opening/closing plates has a spring member for urging said opening/closing plate toward a closed state.

21. The double damper device as claimed in claim 20, wherein said spring members are provided within said respective opening portions.

* * * * *